United States Patent
Kamikura et al.

(10) Patent No.: US 10,481,518 B2
(45) Date of Patent: Nov. 19, 2019

(54) IMAGE FORMING APPARATUS WHICH CHANGES TIME PERIOD FOR MASKING DETECTION OF PERIOD OF ROTATION SYNCHRONOUS SIGNAL

(71) Applicant: CANON KABUSHIKI KAISHA, Tokyo (JP)

(72) Inventors: Takahiro Kamikura, Tokyo (JP); Satoru Takezawa, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/450,798

(22) Filed: Mar. 6, 2017

(65) Prior Publication Data
US 2017/0269501 A1 Sep. 21, 2017

(30) Foreign Application Priority Data
Mar. 18, 2016 (JP) ................. 2016-055678

(51) Int. Cl.
*G03G 15/04* (2006.01)
*G06K 15/00* (2006.01)
(Continued)

(52) U.S. Cl.
CPC ......... *G03G 15/043* (2013.01); *G02B 26/122* (2013.01); *G06K 15/1219* (2013.01);
(Continued)

(58) Field of Classification Search
CPC .. G03G 15/043; G02B 26/122; G02B 26/121; G06K 7/10613; G06K 15/1219;
(Continued)

(56) References Cited

U.S. PATENT DOCUMENTS

| 6,680,744 B2 * | 1/2004 | Ueno ............ B41J 2/471 347/235 |
| 8,665,303 B2 | 3/2014 | Takezawa .......... 347/236 |
| 2017/0052473 A1 | 2/2017 | Seki et al. ........ G03G 15/043 |

FOREIGN PATENT DOCUMENTS

| JP | H08-242343 | 9/1996 |
| JP | 2000218863 A * | 8/2000 |

(Continued)

OTHER PUBLICATIONS

U.S. Appl. No. 15/489,455, filed Apr. 17, 2017.

*Primary Examiner* — Robert B Beatty
(74) *Attorney, Agent, or Firm* — Venable LLP

(57) ABSTRACT

An image forming apparatus including: a drive motor configured to rotate a rotary polygon mirror to deflect light beam; a signal generation unit configured to generate a rotation synchronous signal; and a rotation control unit configured to control a rotation speed of the rotary polygon mirror, wherein the rotation control unit executes a masking processing of masking control of the drive motor based on the rotation synchronous signal, wherein a time period of a first masking processing for a first rotation speed is shorter than a time period of a second masking processing for the second rotation speed, and wherein when the rotation speed of the rotary polygon mirror is changed from the first rotation speed to the second rotation speed, the rotation control unit switches the masking processing from the first masking processing to the second masking processing after reduction of the rotation speed of the rotary polygon mirror is started.

11 Claims, 12 Drawing Sheets

(51) Int. Cl.
*G02B 26/00* (2006.01)
*H04N 1/00* (2006.01)
*G03G 15/043* (2006.01)
*G02B 26/12* (2006.01)
*H04N 1/047* (2006.01)
*H04N 1/053* (2006.01)
*H04N 1/04* (2006.01)
*G06K 15/12* (2006.01)

(52) U.S. Cl.
CPC ......... *H04N 1/0443* (2013.01); *H04N 1/0473* (2013.01); *H04N 1/053* (2013.01)

(58) Field of Classification Search
CPC .... G06K 15/14; H04N 1/0283; H04N 1/0443; H04N 1/047; H04N 1/0473; H04N 1/0476; H04N 1/053
USPC ................ 399/4; 347/243, 259; 358/481
See application file for complete search history.

(56) References Cited

FOREIGN PATENT DOCUMENTS

| | | | | |
|---|---|---|---|---|
| JP | 2005128281 A | * | 5/2005 | |
| JP | 2006-058690 | | 3/2006 | |
| JP | 2009255534 A | * | 11/2009 | ........... G03G 15/326 |
| JP | 2011075648 A | * | 4/2011 | |
| JP | 2011107194 A | * | 6/2011 | |

* cited by examiner

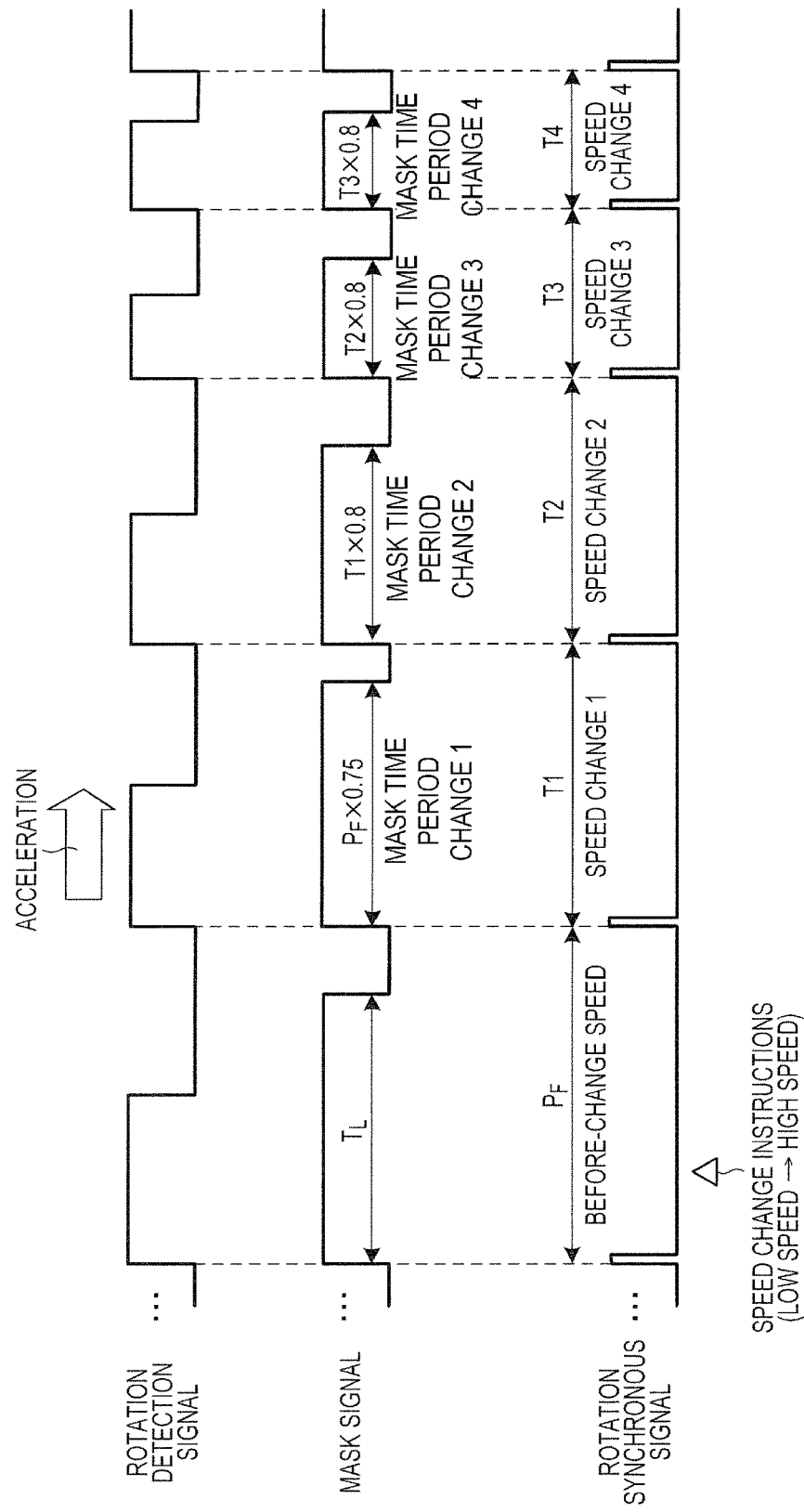

IMAGE FORMING APPARATUS WHICH CHANGES TIME PERIOD FOR MASKING DETECTION OF PERIOD OF ROTATION SYNCHRONOUS SIGNAL

BACKGROUND OF THE INVENTION

Field of the Invention

The present invention relates to an image forming apparatus including a rotary polygon mirror configured to deflect a light beam so as to scan the light beam on a photosensitive member.

Description of the Related Art

In a related-art image forming apparatus, a speed of a rotary polygon mirror is controlled as follows. A pulse period of a rotation synchronous signal including a pulse that is generated in synchronization with a rotation phase of the rotary polygon mirror is detected, and an acceleration/deceleration signal is generated based on a result of comparison between the above-mentioned period and a period corresponding to a target rotation speed. Then, a motor for the rotary polygon mirror is controlled based on the acceleration/deceleration signal. At this time, in order to improve noise resistance of the rotation synchronous signal, there is used a mask signal for masking detection of the period of the rotation synchronous signal only for a predetermined time period.

In Japanese Patent Application Laid-Open No. H08-242343, there is disclosed a technology of generating a mask signal for masking a horizontal synchronization signal being the above-mentioned rotation synchronous signal for a predetermined time period immediately after the horizontal synchronization signal is detected. In Japanese Patent Application Laid-Open No. 2006-58690, there is disclosed an image forming apparatus configured to mask a horizontal synchronization detection signal being the above-mentioned rotation synchronous signal with a mask signal for only a predetermined time period that is based on a setting value of the rotation speed of the rotary polygon mirror after the horizontal synchronization detection signal is detected. In both of the related-art documents, there is performed such a mask setting that the horizontal synchronization signal is masked for a predetermined time period in the control using the detection result of the horizontal synchronization signal, to thereby suppress an erroneous operation due to noise.

In order to satisfactorily form images on various sheet types to be used by a user, the number of types of image forming speeds has been increased in recent years, and thus a difference between the maximum value and the minimum value of the image forming speeds to be used in the same image forming apparatus has increased. This is because it is necessary to control a toner fixing time depending on the sheet type when an image formation process speed and a sheet conveyance speed are changed depending on the sheet type. Further, there are an increasing number of cases where images are printed on various sheet types in one job, for example, printing of a booklet in which the sheet type of the cover sheet and the sheet type of the bookblock sheets differ from each other.

Switching of the process speed for responding to a large variety of sheet types in one job includes switching of the rotation speed of the rotary polygon mirror in accordance with the sheet type. In order to suppress reduction in productivity of image output, it is desired not to stop the rotary polygon mirror at the timing of switching the sheet type in the image forming operation based on one job, but to change the rotation speed of the rotary polygon mirror from a first speed to a second speed. However, there arises a problem when a mask setting having a time period corresponding to a high rotation speed is changed to a mask setting having a time period corresponding to a low rotation speed simultaneously with the change of the rotary polygon mirror from a high rotation speed to a low rotation speed. The problem is that, during a time period of a transient state in which the rotary polygon mirror is decelerated toward the low rotation speed, the mask setting corresponding to the low rotation speed may mask a pulse that is required to be included in the rotation synchronous signal. In such a case, the actual rotation period of the rotary polygon mirror differs from the rotation period of the rotary polygon mirror specified by the image forming apparatus based on the rotation synchronous signal, and hence a large amount of time may be required for control for stabilizing the rotary polygon mirror at the low rotation speed.

SUMMARY OF THE INVENTION

In view of this, the present invention provides an image forming apparatus configured to switch a mask setting when a rotary polygon mirror is changed from a high rotation speed to a low rotation speed, to thereby suppress masking of a rotation signal.

According to one embodiment of the present invention, there is provided an image forming apparatus, which is configured to form an image on a recording medium at an image forming speed that is selectively set from a plurality of image forming speeds, the image forming apparatus comprising:

a photosensitive member;

a light source configured to emit a light beam;

a rotary polygon mirror configured to deflect the light beam emitted from the light source so that the light beam scans a surface of the photosensitive member;

a drive motor configured to rotate the rotary polygon mirror;

a signal generation unit configured to generate a rotation synchronous signal including a pulse that is generated in a period corresponding to a rotation speed of the rotary polygon mirror; and a rotation control unit configured to control the rotation speed of the rotary polygon mirror, the rotation control unit being configured to selectively set, based on a set image forming speed, a rotation speed from a plurality of rotation speeds including a first rotation speed and a second rotation speed which is lower than the first rotation speed, to control the drive motor based on the period of the pulse included in the rotation synchronous signal so that the rotary polygon mirror is rotated at a set rotation speed, wherein the rotation control unit executes a masking processing of masking control of the drive motor based on the rotation synchronous signal in a time period from when a pulse in synchronization with rotation of the rotary polygon mirror is generated to when a next pulse in synchronization with the rotation of the rotary polygon mirror is generated in the rotation synchronous signal, the masking processing being enabled in synchronization with generation of the pulse, wherein a time period of a first masking processing set with respect to the first rotation speed is enabled is shorter than a time period of a second masking processing set with respect to the second rotation speed is enabled, and wherein, in a sequence of switching the rotation speed of the rotary polygon mirror from the first rotation speed to the second rotation speed without stopping the rotary polygon mirror, the rotation control unit switches the masking processing from the first masking processing to the second masking processing after reduction of the rotation speed of the rotary polygon mirror is started.

Further features of the present invention will become apparent from the following description of exemplary embodiments with reference to the attached drawings.

BRIEF DESCRIPTION OF THE DRAWINGS

FIG. 12 is a timing chart for illustrating the rotation detection signal, the mask signal, and the rotation synchronous signal at the time of change from a low speed to a high speed according to the second embodiment.

DESCRIPTION OF THE EMBODIMENTS

Now, with reference to the attached drawings, embodiments of the present invention will be described. An image forming apparatus according to each of the embodiments is configured to form an image on a recording medium by employing an electrophotographic system of developing, with developer (toner), an electrostatic latent image formed by a light beam scanned on a photosensitive member.

First Embodiment (Image Forming Apparatus)

Figure 1:
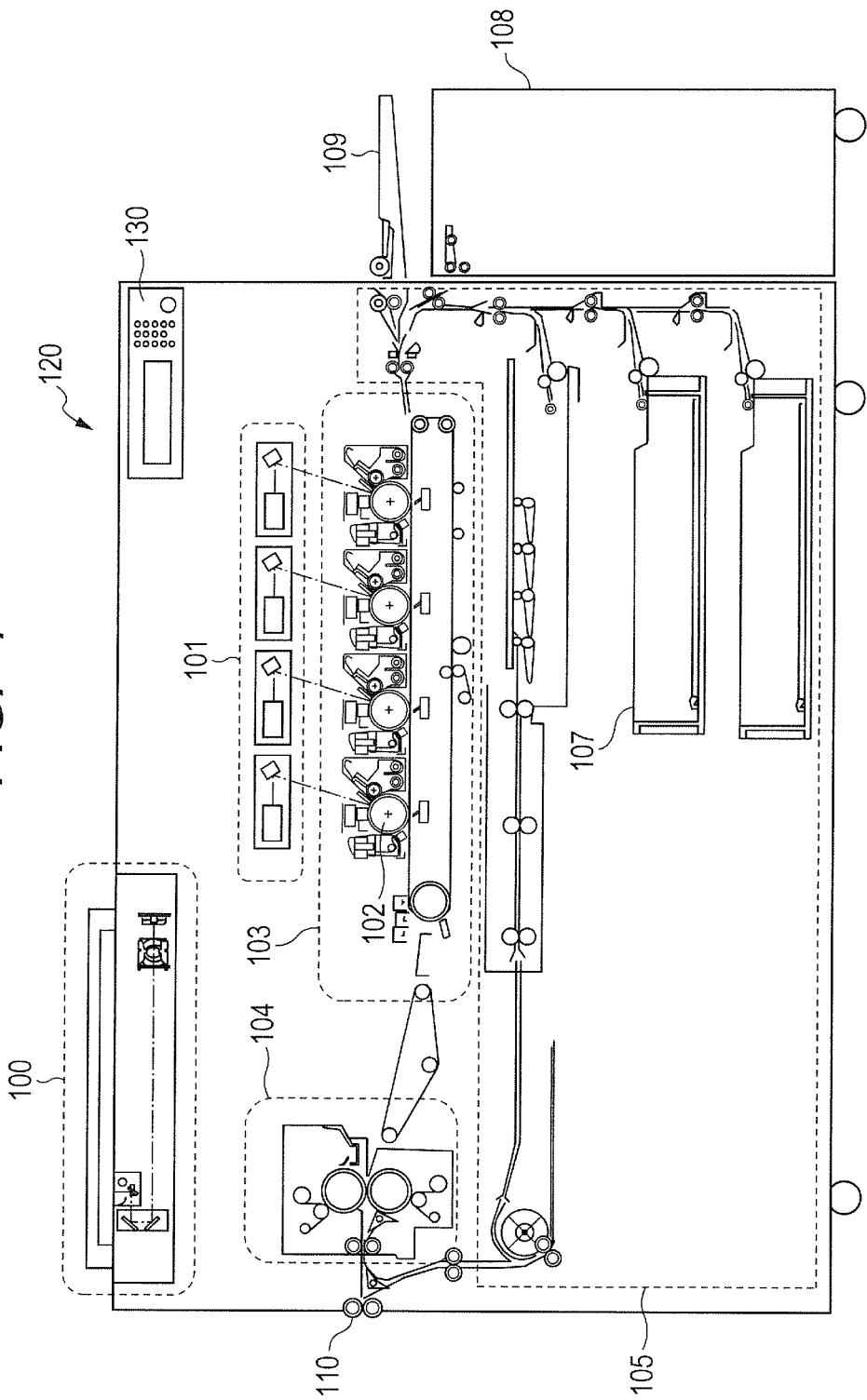
FIG. 1 is a view for illustrating an image forming apparatus according to a first embodiment.

An electrophotographic image forming apparatus 120 according to a first embodiment will be described. FIG. 1 is a view for illustrating the image forming apparatus according to the first embodiment. The image forming apparatus 120 can form images at a plurality of image forming speeds. The image forming apparatus 120 includes an image reading portion 100, a light scanning device 101, a photosensitive drum 102, an image forming portion 103, a fixing portion 104, a conveying portion 105, and a printer control portion (not shown) configured to control those portions. The image reading portion 100 is configured to irradiate an original placed on an original platen with illumination light to convert light reflected from the original into an electrical signal, to thereby generate image data. The light scanning device 101 is configured to cause a light ray (hereinafter referred to as "light beam"), for example, laser light, which is modified based on the image data, to enter a rotary polygon mirror that rotates at a constant angular velocity, to thereby emit the light beam deflected by the rotary polygon mirror toward the photosensitive drum 102.

The image forming portion 103 includes the photosensitive drum 102, a charging device, a developing device, a transfer member, and a cleaning member. The photosensitive drum 102 serving as a photosensitive member is rotated about a rotary axis. The charging device is configured to uniformly charge a surface (surface to be scanned) of the photosensitive drum 102. The light scanning device 101 is configured to scan a light beam on the uniformly-charged surface of the photosensitive drum 102 in a main scanning direction (direction parallel to the rotary axis) to form an electrostatic latent image. The developing device is configured to develop the electrostatic latent image with toner to form a toner image. Meanwhile, the conveying portion 105 is configured to separate one by one recording media (hereinafter referred to as "sheets") that are stacked on a sheet feed cassette 107, a sheet deck 108, or a manual feed tray 109 in accordance with an instruction from the printer control portion, to thereby convey the sheets to the image forming portion 103. The transfer member is configured to transfer the toner image onto the sheet. The cleaning member is configured to collect toner remaining on the photosensitive drum 102 after the transfer. In this embodiment, the image forming portion 103 uses toner of four colors of cyan (C), magenta (M), yellow (Y), and black (K). In order to form toner images of the respective colors, the image forming portion 103 includes four image forming stations arranged in one row.

The image forming portion 103 is configured to sequentially execute an operation of forming a magenta toner image, a yellow toner image, and a black toner image each time a predetermined time period elapses from the start of formation of a cyan toner image. The toner images of the respective colors are sequentially transferred onto the sheet to be superimposed on the sheet. The sheet having the toner images transferred thereon is conveyed to the fixing portion 104. The fixing portion 104 includes a combination of a roller and a belt, and has a heat source, for example, a halogen heater, built therein. The fixing portion 104 is configured to heat and pressurize the sheet to melt the toner images, to thereby fix the toner images on the sheet. With this, a full-color image is formed on the sheet. The sheet having the image formed thereon is delivered outside of the image forming apparatus 120 by a delivery portion 110. Further, when images are formed on both surfaces of the sheet, the conveying portion 105 conveys the sheet that has passed through the fixing portion 104 to a reverse conveyance path to convey the sheet to the image forming portion 103 again.

(Light Scanning Device)

Figure 2:
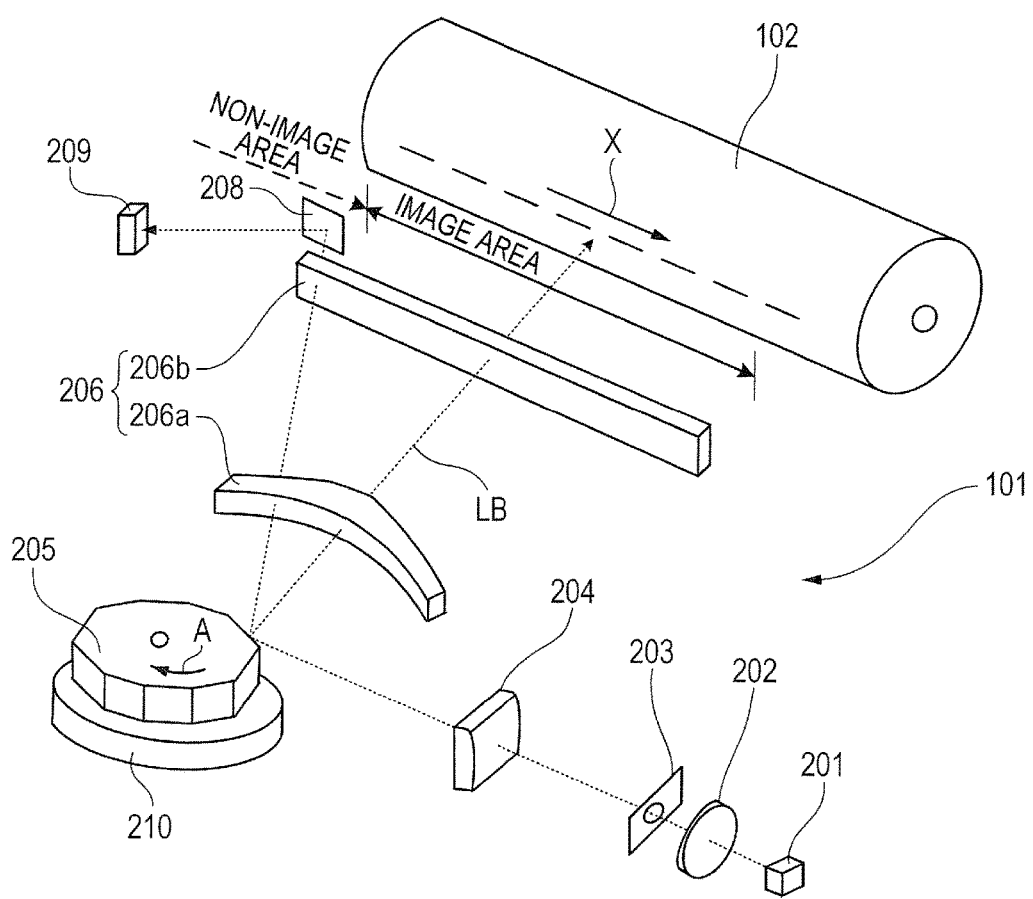
FIG. 2 is a view for illustrating a light scanning device according to the first embodiment.

Now, the light scanning device 101 will be described. In this embodiment, the light scanning device 101 is provided for each of the four image forming stations. However, the light scanning device 101 may be one light scanning device common to the four image forming stations. FIG. 2 is a view for illustrating the light scanning device 101 according to the first embodiment. The light scanning device 101 includes an incident optical system including a light source 201, a collimator lens 202, a diaphragm 203, and a cylindrical lens 204. The light scanning device 101 further includes a rotary polygon mirror 205, which serves as a deflection unit configured to deflect a light beam so as to scan a light beam LB on the surface of the photosensitive drum 102 in the main scanning direction indicated by the arrow X, and a motor 210 configured to rotate the rotary polygon mirror 205 in a direction indicated by the arrow A. The light scanning device 101 further includes fθ lenses 206 (206a and 206b) serving as an imaging optical system configured to image the light beam on the surface of the photosensitive drum 102. The light scanning device 101 further includes a beam detector (hereinafter referred to as "BD") 209 and a BD reflecting mirror 208. The BD reflecting mirror 208 is arranged in a non-image area, which is located on an outer side of an image area of the photosensitive drum 102 in which the electrostatic latent image is formed, in the vicinity of the image area. The BD reflecting mirror 208 is configured to reflect the light beam deflected by the rotary polygon mirror 205 toward the BD 209. The BD 209 is configured to receive (detect) the light beam to output a horizontal synchronization signal (hereinafter referred to as "BD signal") for determining the timing to start emission of the light beam in order to fix a writing start position of the electrostatic latent image in the main scanning direction.

(Rotation Control System)

Figure 3:
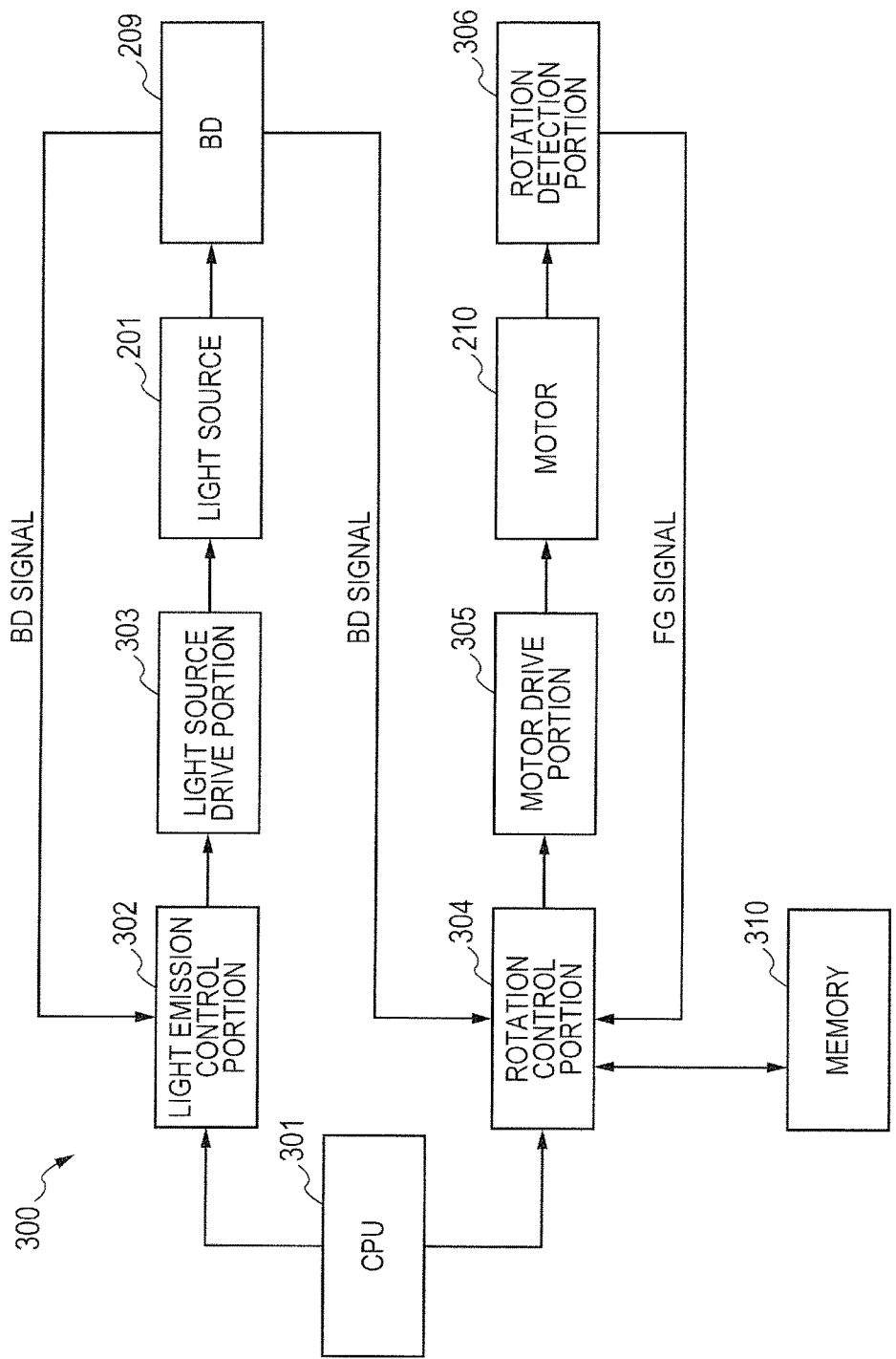
FIG. 3 is a block diagram for illustrating a rotation control system according to the first embodiment.

FIG. 3 is a block diagram of a rotation control system 300 according to the first embodiment. The rotation control system 300 is configured to control the rotation of the motor 210 configured to rotate the rotary polygon mirror 205. The rotation control system 300 includes a CPU 301, a light emission control portion 302, a light source drive portion 303, the light source 201, the BD 209, a rotation control portion 304, a motor drive portion 305, the motor 210 (drive motor), a rotation detection portion 306, and a memory 310. The CPU 301 is provided in the image forming apparatus 120, but the CPU 301 may be provided in the light scanning device 101. The light emission control portion 302, the light source drive portion 303, the light source 201, the BD 209, the rotation control portion 304, the motor drive portion 305, the motor 210, the rotation detection portion 306, and the memory 310 are preferred to be provided in the light scanning device 101.

The CPU 301 is configured to transmit an instruction to the light emission control portion 302 and the rotation control portion 304 to rotate the rotary polygon mirror 205 at a set rotation speed. In this embodiment, the rotary polygon mirror 205 is fixed to a rotor of the motor 210, and hence the rotation speed of the rotary polygon mirror 205 is the same as the rotation speed of the motor 210. Therefore, in this embodiment, the rotation speed of the motor 210 means the rotation speed of the rotary polygon mirror 205. The rotation control portion 304 serving as a rotation control unit is configured to transmit an acceleration signal or a deceleration signal to the motor drive portion 305 in order to rotate the rotary polygon mirror 205 at the set rotation speed. The motor drive portion 305 serving as a drive unit configured to drive the motor 210 is configured to rotate the motor 210 in accordance with the acceleration signal or the deceleration signal. The rotation speed of the motor 210 is detected by the rotation detection portion 306. The rotation detection portion 306 serving as a signal generation unit is configured to generate a frequency generator signal (hereinafter referred to as "FG signal") in accordance with the rotation speed of the motor 210. The FG signal is fed back to the rotation control portion 304. The motor 210 includes a rotor having the rotary polygon mirror 205 and a permanent magnet fixed thereto, and a stator having fixed thereto a coil to be supplied with current from the rotation control portion 304. For example, the rotation detection portion 306 is arranged on a circuit board having the motor 210 mounted thereon so as to be opposed to the permanent magnet provided to the rotor. The rotation detection portion 306 is preferred to be a substrate having a rectangular detection pattern or a Hall element configured to output the FG signal being a rotation detection signal based on the change in magnetic field (magnetic force fluctuation) around the rotation detection portion 306 due to the movement of the permanent magnet along with the rotation of the motor 210. The rotation control portion 304 is configured to generate a rotation synchronous signal based on a rising edge or a falling edge of the fed-back FG signal. The rotation control portion 304 is configured to compare a period of the rotation synchronous signal generated based on the FG signal with a period of the rotation synchronous signal at the set rotation speed, to thereby transmit the acceleration signal or the deceleration signal to the motor drive portion 305 based on the comparison result. The rotation control portion 304 is configured to control the motor 210 so that the rotation speed of the rotary polygon mirror 205 reaches the set rotation speed, and to control the motor 210 so that the rotary polygon mirror 205 is maintained at the set rotation speed.

The light emission control portion 302 is configured to control the light source drive portion 303 such that the light source 201 emits the light beam in the non-image area of the photosensitive drum 102, and that a sufficient amount of light beam for the BD 209 to generate the BD signal enters the BD 209 for each reflection surface of the rotary polygon mirror 205. The BD 209 is configured to feed back the BD signal to the light emission control portion 302. When the electrostatic latent image is to be formed on the surface of the photosensitive drum 102 with the light beam modulated in accordance with the image data, the light emission control portion 302 controls the timing to start writing the electrostatic latent image in the main scanning direction in synchronization with the BD signal. The BD signal is also fed back to the rotation control portion 304. The rotation control portion 304 may generate the rotation synchronous signal based on the BD signal to control the rotation of the rotary polygon mirror 205.

(Noise Removal Action)

Figure 4A:
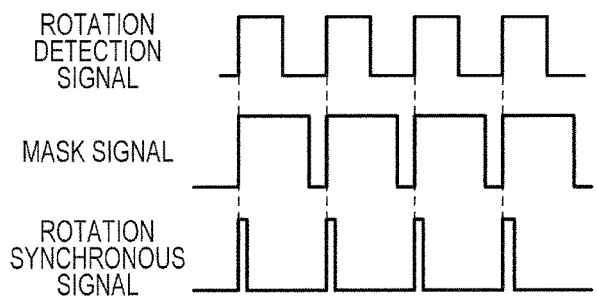
FIG. 4A, FIG. 4B, and FIG. 4C are timing charts for illustrating a rotation detection signal, a mask signal, and a rotation synchronous signal.
Figure 4B:
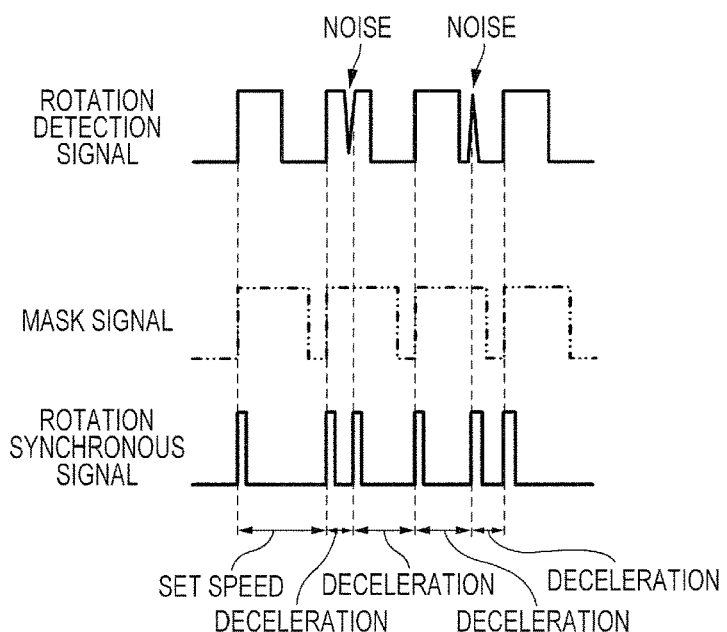
Figure 4C:
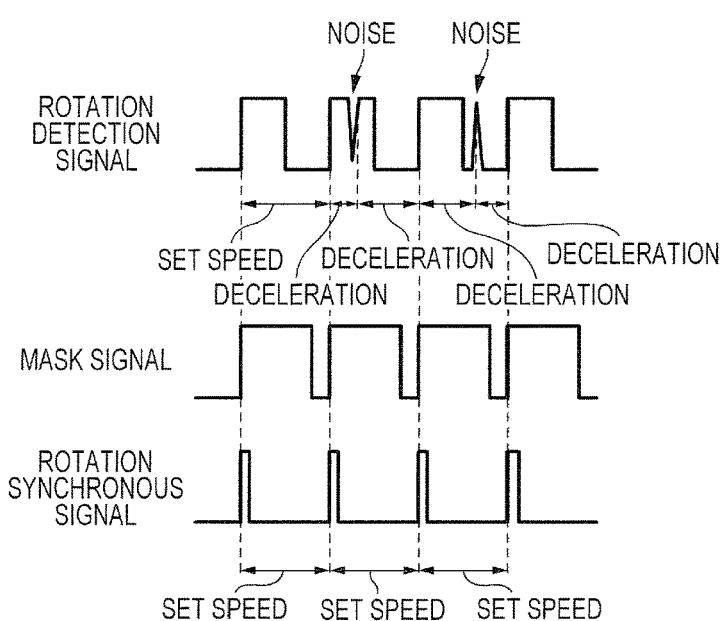

FIG. 4A, FIG. 4B, and FIG. 4C are timing charts for illustrating the rotation detection signal, a mask signal, and the rotation synchronous signal. In order to control the rotation of the rotary polygon mirror 205, the rotation control portion 304 generates the rotation synchronous signal based on the FG signal or the BD signal, to thereby control the rotation speed of the motor 210 based on the rotation synchronous signal. In this case, the FG signal is used as the rotation detection signal of the motor 210. However, a similar action is produced even when the BD signal is used as the rotation detection signal.

FIG. 4A is a timing chart for illustrating the rotation detection signal, the mask signal, and the rotation synchronous signal when the motor 210 is rotated at the set rotation speed. The FG signal is input to the rotation control portion 304 as the rotation detection signal illustrated in FIG. 4A. The rotation control portion 304 generates the rotation synchronous signal based on the rising edge of the rotation detection signal. Further, the rotation control portion 304 generates the mask signal for masking a rotation synchronous signal generated by noise added to the rotation detection signal of the motor 210. The mask signal is set based on the set rotation speed of the motor 210. The mask signal masks the rotation synchronous signal only for a predetermined time period, to thereby reduce the effect of the noise on the rotation synchronous signal.

FIG. 4B is a chart for illustrating the noise added to the rotation detection signal and the rotation synchronous signal generated by the noise. The rotation control portion 304 generates the rotation synchronous signal in accordance with the rising edge of the noise added to the rotation detection signal. When there is no mask signal, the rotation control portion 304 detects the erroneously-generated rotation synchronous signal, to thereby determine that the rotation speed of the motor 210 has been increased to output the deceleration signal to the motor drive portion 305. Therefore, the rotation speed of the motor 210 is erroneously reduced, and thus the rotary polygon mirror 205 cannot be maintained at the set rotation speed.

FIG. 4C is a chart for illustrating the rotation synchronous signal when the mask signal is generated. The mask signal masks the rotation synchronous signal only for a predetermined time period. As is understood from FIG. 4C, the rotation synchronous signal that is erroneously generated based on the rising edge of the noise added to the rotation detection signal is masked by the mask signal. Therefore, the rotation control portion 304 can control the rotation speed of the motor 210 based on the rotation synchronous signal that is less affected by the noise, and hence the rotary polygon mirror 205 can be maintained at the set rotation speed. When the mask signal is present (mask signal is active), the rotation control portion 304 may cancel control of the motor 210 based on the rotation synchronous signal.

(Change of Image Forming Speed)

The image forming apparatus 120 of this embodiment can operate at a plurality of image forming speeds depending on the sheet type (type of the recording medium). For example, paper having a basis weight of 105 gsm or less is referred to as plain paper or thin paper, and paper having a basis weight that is larger than 105 gsm is referred to as thick paper or coated paper subjected to special processing. The thick paper or the coated paper has a basis weight that is larger than that of the plain paper or the thin paper, and hence the thick paper or the coated paper is required to be passed through the fixing portion 104 at a speed lower than that required for the plain paper or the thin paper. In view of this, the image forming apparatus 120 of this embodiment is configured to control a conveyance speed of the thick paper or the coated paper in the fixing portion 104 so as to be lower than the conveyance speed of the plain paper or the thin paper in the fixing portion 104. Along therewith, the image forming apparatus 120 is configured to also control the conveyance speed of the thick paper or the coated paper in the image forming portion 103 so as to be lower than the conveyance speed of the plain paper or the thin paper in the image forming portion 103. In synchronization with the conveyance speed of the recording medium in the image forming portion 103, a rotation speed of the photosensitive drum is also set such that the rotation speed when an image is formed on the thick paper or the coated paper is lower than the rotation speed when an image is formed on the plain paper or the thin paper. In this embodiment, the rotation speed of the photosensitive drum 102 is referred to as "image forming speed". The sheet type is input to the CPU 301 through an image forming instruction from an external device, for example, a personal computer (PC), or through an operation on an operation unit 130 by a user. The CPU 301 sets the image forming speed based on the input sheet type. The CPU 301 sets the rotation speed of the motor 210 for rotating the rotary polygon mirror 205 in accordance with the set image forming speed. That is, the CPU 301 functions as a rotation speed setting unit configured to selectively set a plurality of rotation speeds of the rotary polygon mirror 205. The rotation control portion 304 generates the rotation synchronous signal based on the rising edge of the rotation detection signal. Simultaneously, the rotation control portion 304 generates the mask signal for masking the rotation synchronous signal. That is, the rotation control portion 304 functions as a synchronous signal generation unit configured to generate the rotation synchronous signal including a pulse having a period that is based on the rotation speed of the rotary polygon mirror 205. Further, the rotation control portion 304 functions as a mask signal generation unit configured to generate the mask signal. The rotation control portion 304 executes a mask setting of canceling control of the motor 210 based on the rotation synchronous signal in a time period from when a pulse in synchronization with the rotation of the rotary polygon mirror 205 is generated to when a next pulse in synchronization with the rotation of the rotary polygon mirror 205 is generated in the rotation synchronous signal. The rotation control portion 304 sets a time period for masking the rotation synchronous signal with the mask signal (time period of the mask setting, hereinafter referred to as "mask time period") based on the set rotation speed. The CPU 301 and the rotation control portion 304 function as a rotation control unit configured to control the rotation speed of the rotary polygon mirror 205. The rotation control unit controls the motor 210 based on the period of the pulse included in the rotation synchronous signal so that the rotary polygon mirror 205 is rotated at the set rotation speed. Further, the rotation control unit executes a mask setting of canceling control of the motor 210 based on the rotation synchronous signal in a time period from when a pulse in synchronization with the rotation of the rotary polygon mirror 205 is generated to when a next pulse in synchronization with the rotation of the rotary polygon mirror 205 is generated in the rotation synchronous signal. First, with reference to FIG. 5, control of changing the rotation speed of the rotary polygon mirror 205 at the time of change of the image forming speed will be described.

(Rotation Speed Changing Control)

The rotation speed of the rotary polygon mirror when an image is formed on the plain paper or the thin paper is referred to as a first rotation speed, and the rotation speed of the rotary polygon mirror when an image is formed on the thick paper or the coated paper is referred to as a second rotation speed. In this embodiment, the first rotation speed is higher than the second rotation speed. The rotation speed of the rotary polygon mirror is defined based on the rotation speed of the photosensitive drum, output resolution, and the number of light emitting points of the light source 201, and is not defined only based on the rotation speed of the photosensitive drum. Therefore, the first rotation speed may be lower than the second rotation speed.

Figure 5:
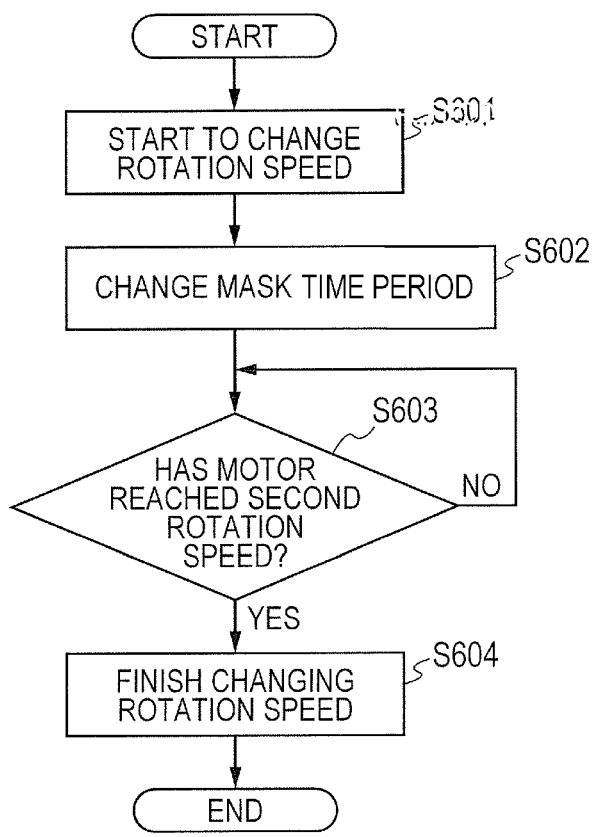
FIG. 5 is a flowchart for illustrating rotation speed changing control in a reference example.

FIG. 5 is a flowchart for illustrating rotation speed changing control in a reference example. In the rotation speed changing control of the reference example, the rotation control portion 304 starts the rotation speed changing control in response to reception of an instruction from the CPU 301 to change the rotation speed of the motor 210 from the first rotation speed to the second rotation speed. The rotation control portion 304 changes the rotation speed of the motor 210 from the first rotation speed to the second rotation speed. For this change, the rotation control portion 304 outputs the deceleration signal or the acceleration signal for change from the second rotation speed to the first rotation speed to the motor drive portion 305 to start the change of the rotation speed of the motor 210 (S601). Simultaneously, the rotation control portion 304 changes the mask time period of the mask signal from a first mask time period corresponding to the first rotation speed to a second mask time period corresponding to the second rotation speed (S602). The rotation control portion 304 determines whether or not the rotation speed of the motor 210 has reached the second rotation speed based on the rotation synchronous signal (S603). When the rotation speed of the motor 210 has not reached the second rotation speed (NO in S603), the processing returns to Step S603 to continue the change of the rotation speed of the motor 210. When the rotation speed of the motor 210 has reached the second rotation speed (YES in S603), the rotation control portion 304 finishes changing the rotation speed of the motor 210 (S604). The rotation speed of the motor 210 is maintained at the second rotation speed by the rotation control portion 304. The rotation control portion 304 ends the rotation speed changing control.

When the second rotation speed is higher than the first rotation speed, that is, when the rotation speed of the motor 210 is changed from a low speed to a high speed, the rotation control portion 304 can change the rotation speed of the motor 210 without a problem under the rotation speed changing control illustrated in FIG. 5. However, when the second rotation speed is lower than the first rotation speed, that is, when the rotation speed of the motor 210 is changed from a high speed to a low speed, the following problem may occur under the rotation speed changing control illustrated in FIG. 5.

Figure 6:
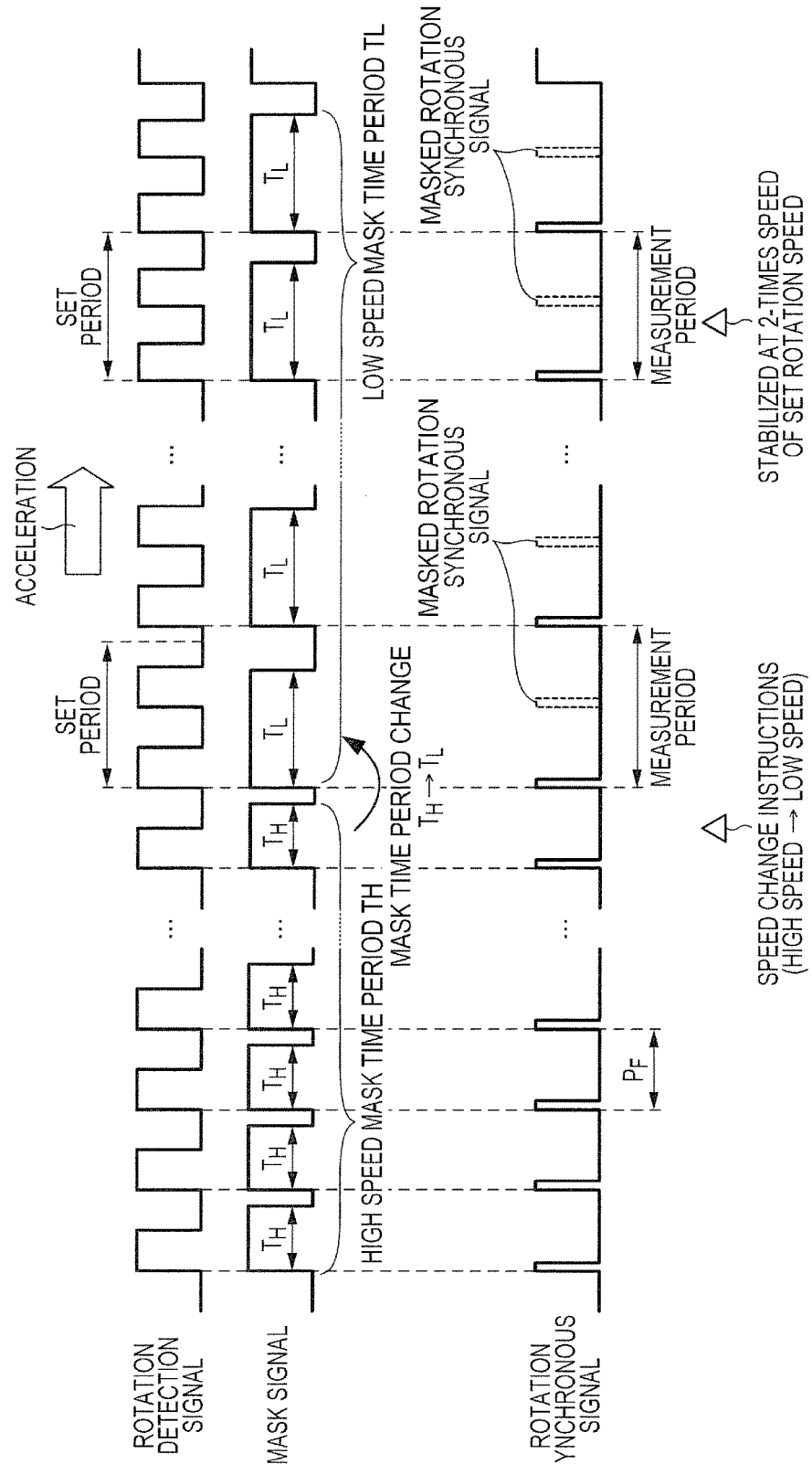
FIG. 6A, FIG. 6B, and FIG. 6C are timing charts for illustrating the rotation detection signal, the mask signal, and the rotation synchronous signal at the time of change from a high speed to a low speed in the reference example.

FIG. 6A, FIG. 6B, and FIG. 6C are timing charts for illustrating the rotation detection signal, the mask signal, and the rotation synchronous signal at the time of change from a high speed to a low speed in the reference example. With reference to FIG. 6A, FIG. 6B, and FIG. 6C, a relationship between the rotation synchronous signal and the change of the mask time period of the mask signal when the second speed is lower than the first speed, that is, when the rotation speed of the motor 210 is changed from a high speed to a low speed will be described. FIG. 6A is a chart for illustrating the rotation detection signal, the mask signal, and the rotation synchronous signal when the motor 210 is rotated at a high speed (first rotation speed). The mask signal has a first mask time period, that is, a high speed mask time period $T_H$ corresponding to the high speed.

When the rotation control portion 304 receives, from the CPU 301, an instruction to change the speed from the high speed (first rotation speed) to a low speed (second rotation speed), the rotation control portion 304 starts the rotation speed changing control. FIG. 6B is a chart for illustrating the rotation detection signal, the mask signal, and the rotation synchronous signal when the rotation speed is changed from the high speed (first rotation speed) to the low speed (second rotation speed). Simultaneously with the start of the change of the rotation speed of the motor 210, the mask time period of the mask signal is changed from the high speed mask time period $T_H$ corresponding to the high speed (first rotation speed) to a low speed mask time period $T_L$ corresponding to the low speed (second rotation speed). The low speed mask time period $T_L$ is longer than the high speed mask time period $T_H$. Even when the change of the rotation speed of the motor 210 is started, the rotation speed of the motor 210 does not immediately reach the low speed (second rotation speed). Therefore, when the low speed mask time period $T_L$ is sufficiently larger than a period $P_F$ of the rotation synchronous signal at the first speed, the rotation synchronous signal is masked by the mask signal having the low speed mask time period $T_L$. The necessary rotation synchronous signal is masked, and hence the rotation control portion 304 controls the rotation speed of the motor 210 based on the erroneous rotation synchronous signal. In the example illustrated in FIG. 6B, the mask signal having the low speed mask time period $T_L$ masks one pulse of the rotation synchronous signal. Therefore, a measurement period of the rotation synchronous signal is two times as large as the original period. The rotation control portion 304 controls the rotation speed of the motor 210 based on the measurement period that is two times as large as the original period, and hence, although the motor 210 is required to be decelerated, the motor 210 is accelerated instead. The rotation control portion 304 controls the rotation speed of the motor 210 such that the measurement period that is two times as large as the original period matches with the set period for the low speed (second rotation speed), and hence as illustrated in FIG. 6C, the rotation speed of the motor 210 is stabilized at a 2-times speed of the set low speed (second rotation speed). As described above, when the rotation speed is changed from the high speed (first rotation speed) to the low speed (second rotation speed), and when the mask time period of the mask signal is changed simultaneously with the start of the change of the rotation speed of the motor 210, the rotation speed changing control may not be correctly performed.

Figure 7:
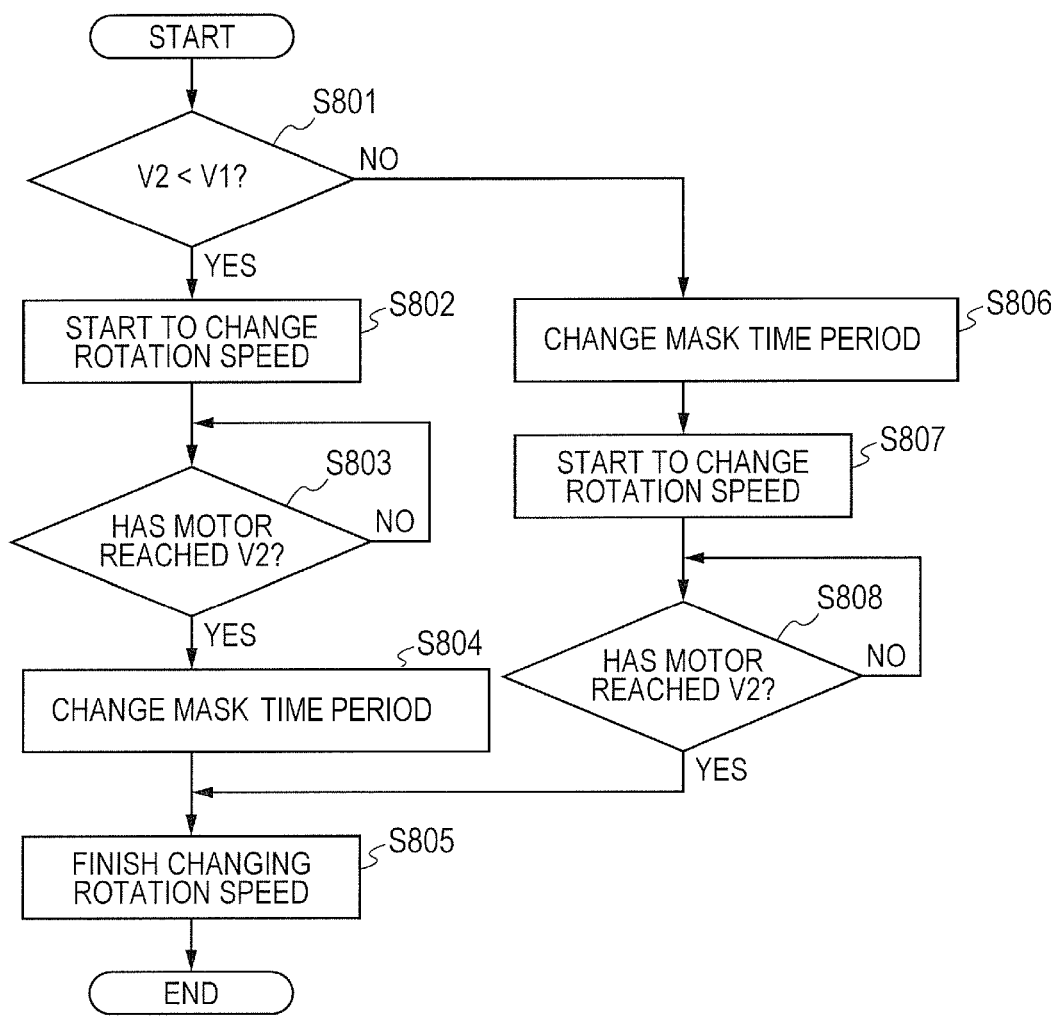
FIG. 7 is a flowchart for illustrating rotation speed changing control to be executed by a rotation control portion according to the first embodiment.

Next, the rotation speed changing control of the rotary polygon mirror 205 when the image forming speed is changed in the image forming apparatus 120 according to this embodiment will be described. FIG. 7 is a flowchart for illustrating the rotation speed changing control to be executed by the rotation control portion 304 according to the first embodiment. The rotation control portion 304 executes the rotation speed changing control based on a program stored in the memory (storage portion) 310. When the rotation control portion 304 receives, from the CPU 301, an instruction to change the rotation speed of the motor 210 from a currently-set first rotation speed V1 to a second rotation speed V2 that is different from the first rotation speed V1, the rotation control portion 304 starts the rotation speed changing control. The rotation control portion 304 determines whether or not the second rotation speed V2 is lower than the first rotation speed V1 (S801). When the second rotation speed V2 is lower than the first rotation speed V1 (YES in S801), the rotation control portion 304 outputs the deceleration signal to the motor drive portion 305 to start the change of the rotation speed of the motor 210 (S802). That is, when the rotation speed of the motor 210 is changed from the high speed to the low speed, the rotation control portion 304 changes the rotation speed of the motor 210 before the mask time period of the mask signal is changed.

The rotation control portion 304 determines whether or not the rotation speed of the motor 210 has reached the second rotation speed V2 based on the rotation synchronous signal (S803). When the rotation speed of the motor 210 has not reached the second rotation speed V2 (NO in S803), the processing returns to Step S803 to continue the reduction of the rotation speed of the motor 210. When the rotation speed of the motor 210 has reached the second rotation speed V2 (YES in S803), the reduction of the rotation speed of the rotary polygon mirror 205 is completed. In response to the completion of the reduction of the rotation speed of the rotary polygon mirror 205, the rotation control portion 304 changes the mask time period of the mask signal from the first mask time period corresponding to the first rotation speed V1 to the second mask time period corresponding to the second rotation speed V2 (S804). The second rotation speed V2 is lower than the first rotation speed V1, and hence the second mask time period is longer than the first mask time period. When the rotation speed of the motor 210 is changed from the high speed to the low speed, the rotation control portion 304 switches the mask time period of the mask signal after the rotation speed of the motor 210 has reached the second rotation speed V2 (set speed after the change). The rotation control portion 304 finishes changing the rotation speed of the motor 210 (S805). The rotation speed of the motor 210 is maintained at the second rotation speed V2 by the rotation control portion 304. The rotation control portion 304 ends the rotation speed changing control.

Figure 8:
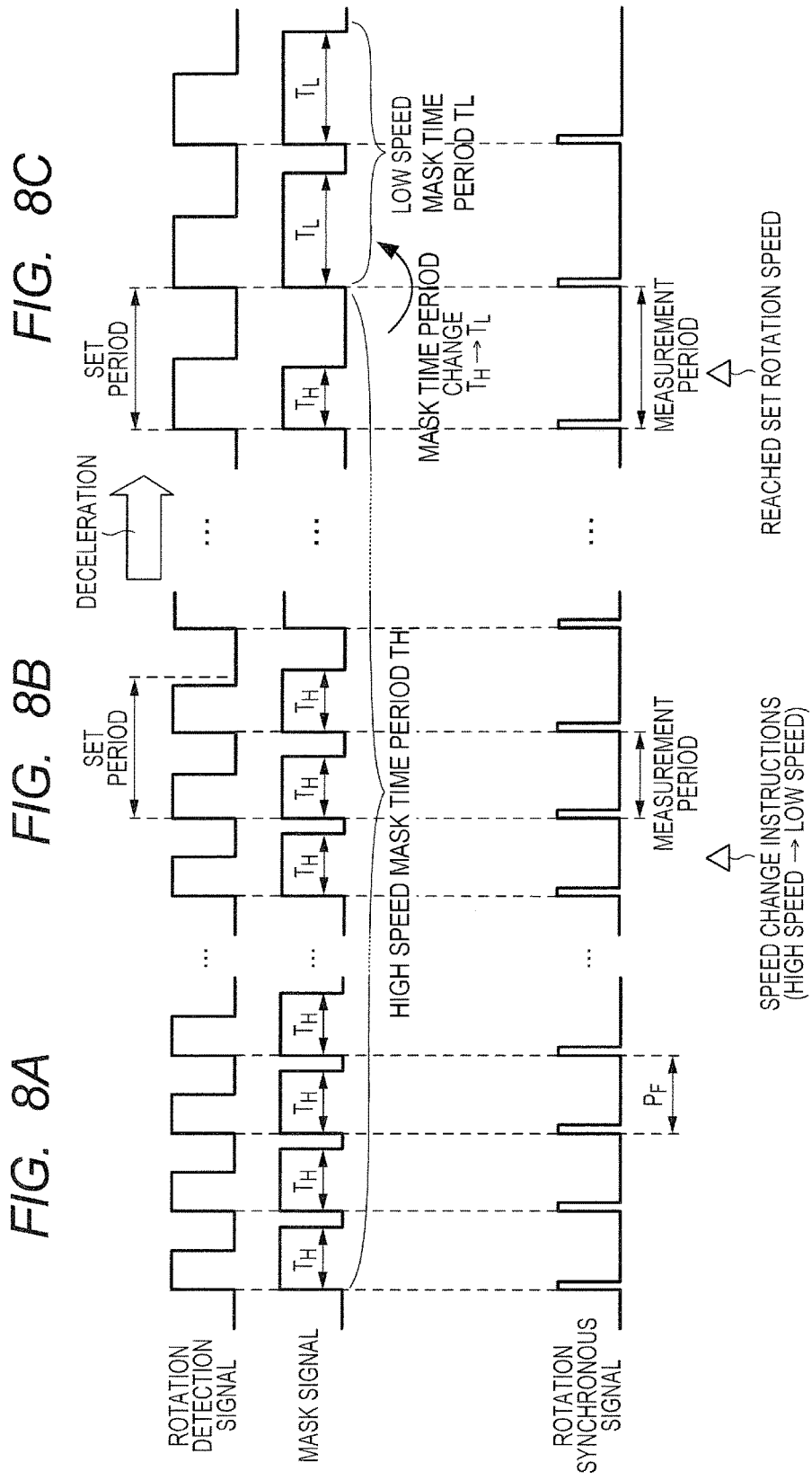
FIG. 8A, FIG. 8B, and FIG. 8C are timing charts for illustrating the rotation detection signal, the mask signal, and the rotation synchronous signal at the time of change from a high speed to a low speed according to the first embodiment.

Now, the rotation detection signal, the mask signal, and the rotation synchronous signal in Step S802 to Step S804 of the flowchart of FIG. 7 will be described. FIG. 8A, FIG. 8B, and FIG. 8C are timing charts for illustrating the rotation detection signal, the mask signal, and the rotation synchronous signal at the time of change from the high speed to the low speed according to the first embodiment. In this case, the first mask time period corresponding to the first rotation speed V1, that is, the high speed is referred to as a high speed mask time period $T_H$, and the second mask time period corresponding to the second rotation speed V2, that is, the low speed is referred to as a low speed mask time period $T_L$. With reference to FIG. 8A, FIG. 8B, and FIG. 8C, the relationship between the rotation synchronous signal and the change of the mask time period of the mask signal when the rotation speed of the motor 210 is changed from the high speed to the low speed will be described. FIG. 8A is a chart for illustrating the rotation detection signal, the mask signal, and the rotation synchronous signal when the motor 210 is rotated in a steady state at the high speed (first rotation speed V1). The mask signal has the high speed mask time period $T_H$.

As illustrated in FIG. 8B, when the rotation control portion 304 receives, from the CPU 301, an instruction to change the speed from the high speed (first rotation speed V1) to the low speed (second rotation speed V2), the rotation control portion 304 starts the rotation speed changing control. The speed is changed from the high speed (first rotation speed V1) to the low speed (second rotation speed V2), and hence the rotation control portion 304 outputs the deceleration signal to the motor drive portion 305 to start the deceleration of the motor 210. At this time, the rotation control portion 304 does not change the mask time period of the mask signal from the high speed mask time period $T_H$ to the low speed mask time period $T_L$, but maintains the high speed mask time period $T_H$. Therefore, the necessary rotation synchronous signal is not masked by the mask signal.

As illustrated in FIG. 8C, when the measurement period of the rotation synchronous signal matches with the set period for the low speed (second rotation speed V2), the rotation control portion 304 determines that the rotation speed of the motor 210 has reached the low speed (second rotation speed V2). When the rotation speed of the motor 210 has reached the low speed, the rotation control portion 304 changes the mask time period of the mask signal from the high speed mask time period $T_H$ to the low speed mask time period $T_L$. The low speed mask time period $T_L$ is longer than the high speed mask time period $T_H$, and hence erroneous detection of the rotation synchronous signal at the low speed (second rotation speed V2) can be prevented more reliably. The rotation control portion 304 finishes changing the rotation speed of the motor 210. The rotation speed of the motor 210 is maintained at the low speed (second rotation speed V2) by the rotation control portion 304.

As described above, when the rotation speed of the motor 210 is changed from the high speed to the low speed, the mask time period of the mask signal is changed after the rotation speed of the motor 210 has reached the low speed (set speed after the change). With this, the necessary rotation synchronous signal is not masked by the mask signal after the change, and the rotation speed of the motor 210 can be changed while maintaining the noise removal action.

Referring back to FIG. 7, when the second rotation speed V2 is not lower than the first rotation speed V1 (NO in S801), on the other hand, the rotation control portion 304 changes the mask time period of the mask signal from the first mask time period corresponding to the first rotation speed to the second mask time period corresponding to the second rotation speed (S806). The second rotation speed V2 is not lower than the first rotation speed V1, and hence the second mask time period is shorter than the first mask time period. After that, the rotation control portion 304 outputs the acceleration signal to the motor drive portion 305 to start the change of the rotation speed of the motor 210 (S807). When the rotation speed of the motor 210 is changed from the low speed to the high speed, the rotation control portion 304 changes the rotation speed of the motor 210 after the mask time period of the mask signal is changed. If the rotation speed of the motor 210 is changed while maintaining the first mask time period corresponding to the first rotation speed V1 that is the low speed of the motor 210, the necessary rotation synchronous signal may be masked by the mask signal having the long first mask time period during the acceleration of the motor 210. Therefore, the rotation speed of the motor 210 cannot be controlled to the target second rotation speed V2. In view of this, when the rotation speed of the motor 210 is changed from the low speed to the high speed, the rotation control portion 304 changes the mask time period of the mask signal to the short second mask time period before the rotation speed of the motor 210 is changed. That is, when the rotation speed of the motor 210 is changed from the low speed to the high speed, the rotation control portion 304 changes the mask time period of the mask signal to the short second mask time period before the rotation speed of the motor 210 is changed.

The rotation control portion 304 determines whether or not the rotation speed of the motor 210 has reached the second rotation speed V2 based on the rotation synchronous signal (S808). When the rotation speed of the motor 210 has not reached the second rotation speed V2 (NO in S808), the processing returns to Step S808 to continue the increase of the rotation speed of the motor 210. When the rotation speed of the motor 210 has reached the second rotation speed V2 (YES in S808), the rotation control portion 304 finishes changing the rotation speed of the motor 210 (S805). The rotation speed of the motor 210 is maintained at the second rotation speed V2 by the rotation control portion 304. The rotation control portion 304 ends the rotation speed changing control. As described above, when the rotation speed of the motor 210 is changed from the low speed to the high speed, the rotation control portion 304 changes the mask time period of the mask signal before the rotation speed of the motor 210 reaches the second rotation speed V2 (set speed after the change).

Figure 9:
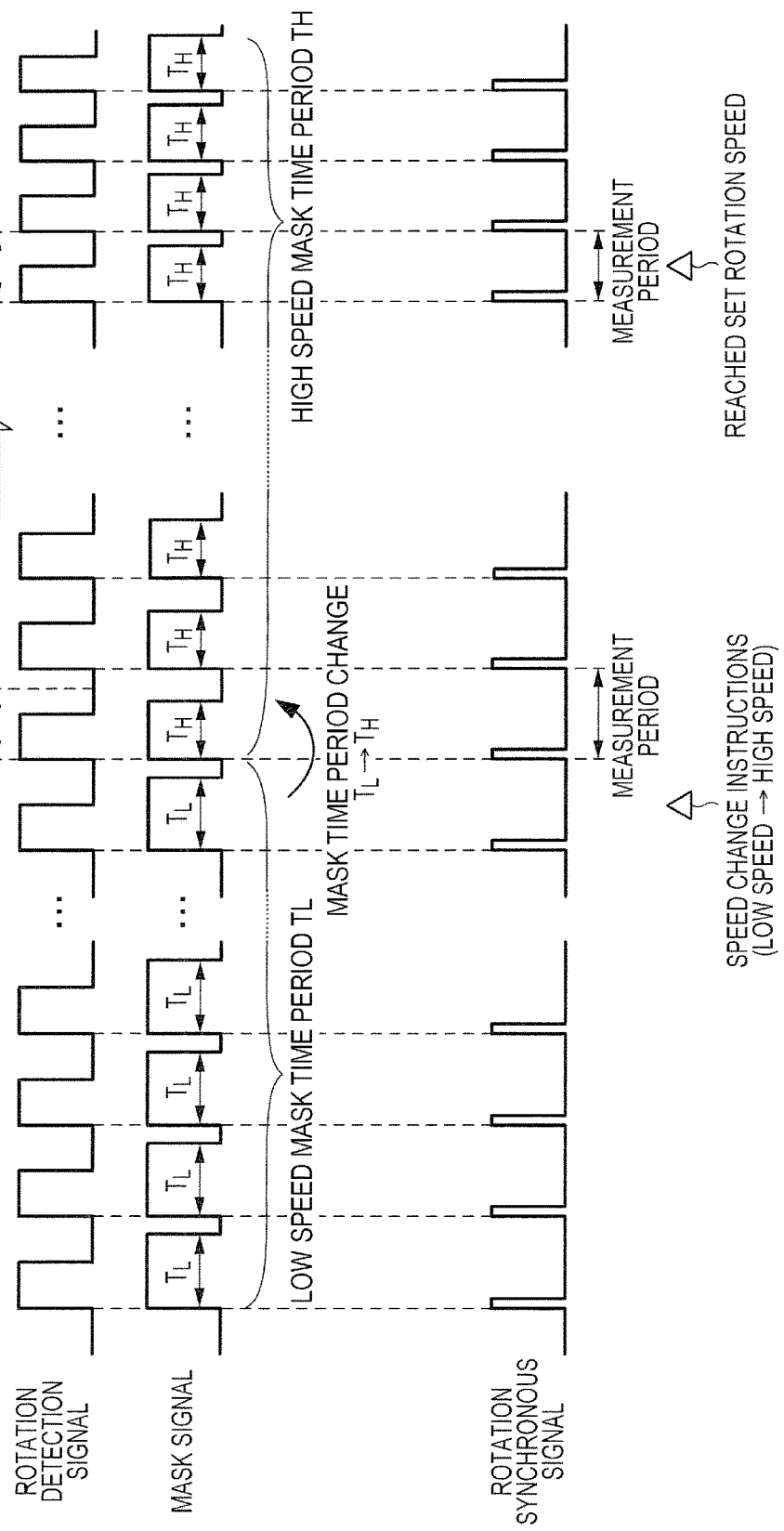
FIG. 9A, FIG. 9B, and FIG. 9C are timing charts for illustrating the rotation detection signal, the mask signal, and the rotation synchronous signal at the time of change from a low speed to a high speed according to the first embodiment.

Now, the rotation detection signal, the mask signal, and the rotation synchronous signal in Step S806 to Step S808 of the flowchart of FIG. 7 will be described. FIG. 9A, FIG. 9B, and FIG. 9C are timing charts for illustrating the rotation detection signal, the mask signal, and the rotation synchronous signal at the time of change from the low speed to the high speed according to the first embodiment. In this case, the first mask time period corresponding to the first rotation speed V1, that is, the low speed is referred to as a low speed mask time period $T_L$, and the second mask time period corresponding to the second rotation speed V2, that is, the high speed is referred to as a high speed mask time period $T_H$. With reference to FIG. 9A, FIG. 9B, and FIG. 9C, the relationship between the rotation synchronous signal and the change of the mask time period of the mask signal when the rotation speed of the motor 210 is changed from the low speed to the high speed will be described. FIG. 9A is a chart for illustrating the rotation detection signal, the mask signal, and the rotation synchronous signal when the motor 210 is rotated in a steady state at the low speed (first rotation speed V1). The mask signal has the low speed mask time period $T_L$.

As illustrated in FIG. 9B, when the rotation control portion 304 receives, from the CPU 301, an instruction to change the speed from the low speed (first rotation speed V1) to the high speed (second rotation speed V2), the rotation control portion 304 starts the rotation speed changing control. The speed is changed from the low speed (first rotation speed V1) to the high speed (second rotation speed V2), and hence the rotation control portion 304 changes the mask time period of the mask signal from the low speed mask time period $T_L$ to the high speed mask time period $T_H$. After that, the rotation control portion 304 outputs the acceleration signal to the motor drive portion 305 to start the acceleration of the motor 210. The high speed mask time period $T_H$ is shorter than the low speed mask time period $T_L$, and hence even when the mask time period is changed before the rotation speed of the motor 210 reaches the high speed (set speed after the change), the mask signal does not mask the necessary rotation synchronous signal. If the mask time period is changed after the rotation speed of the motor 210 has reached the high speed (set speed after the change), the necessary rotation synchronous signal may be masked by the mask signal having the low speed mask time period $T_L$ that is longer than the high speed mask time period $T_H$ during the acceleration of the motor 210. When the necessary rotation synchronous signal is masked by the mask signal having the low speed mask time period $T_L$, the speed may be increased up to a 2-times speed of the set high speed (set speed after the change). In view of this, in this embodiment, when the rotation speed of the motor 210 is changed from the low speed to the high speed, the rotation control portion 304 causes the rotation speed of the motor 210 to reach the high speed (set speed after the change) after the mask time period of the mask signal is changed.

As illustrated in FIG. 9C, when the measurement period of the rotation synchronous signal matches with the set period for the high speed (second rotation speed V2), the rotation control portion 304 determines that the rotation speed of the motor 210 has reached the high speed (second rotation speed V2). The rotation control portion 304 finishes changing the rotation speed of the motor 210. The rotation speed of the motor 210 is maintained at the high speed (second rotation speed V2) by the rotation control portion 304.

As described above, when the rotation speed of the motor 210 is changed from the low speed to the high speed, the rotation speed of the motor 210 is changed after the mask time period of the mask signal is changed. With this, the necessary rotation synchronous signal is not masked by the mask signal after the change, and the rotation speed of the motor 210 can be changed while maintaining the noise removal action.

In the first embodiment, the rotation control portion 304 generates the rotation synchronous signal based on the FG signal output from the rotation detection portion 306. However, the rotation control portion 304 may generate the rotation synchronous signal based on the BD signal output from the BD 209. Next, advantages and disadvantages when the FG signal and the BD signal are used will be described. In general, as compared to the FG signal, the BD signal has the advantages that there is less jitter component and that the rotation synchronous signal can be generated with high accuracy. However, in order to detect the BD signal, the light beam is required to be emitted from the light source 201 so as to enter the BD 209. When the rotary polygon mirror 205 is rotated in a steady state, the light beam can be emitted from the light source 201 at a predetermined sequence such that the light beam enters the BD 209 without exposing the photosensitive drum 102, to thereby cause the BD 209 to output the BD signal. However, when the speed of the rotary polygon mirror 205 is changed, it is difficult to cause the light beam to enter the BD 209 without exposing the photosensitive drum 102 with the light beam. Therefore, there is a disadvantage in that, in order to execute the rotation speed changing control with use of the BD signal in the image forming apparatus according to the first embodiment, it is necessary to allow the exposure of the photosensitive drum 102 or to prevent the exposure of the photosensitive drum 102 with a physical shutter or the like. On the other hand, when the rotation synchronous signal is generated based on the FG signal, it is unnecessary to use the light beam, and hence there is an advantage in that the photosensitive drum 102 is not unnecessarily exposed with light.

In the first embodiment, when the second rotation speed V2 after the change is lower than the first rotation speed V1 before the change, the mask signal is changed after the rotation speed of the motor 210 is changed. With this, the rotation speed of the motor 210 can be changed while maintaining the noise removal action and without masking the necessary rotation synchronous signal. Further, when the second rotation speed V2 after the change is higher than the first rotation speed V1 before the change, the rotation speed of the motor 210 is changed after the mask signal is changed. With this, the rotation speed of the motor 210 can be changed while maintaining the noise removal action and without masking the necessary rotation synchronous signal.

Second Embodiment

Next, with reference to FIG. 10 to FIG. 12, a second embodiment of the present invention will be described. In the second embodiment, like configurations as those of the first embodiment are denoted by like reference symbols to omit the description thereof. The image forming apparatus 120, the light scanning device 101, and the rotation control system 300 of the second embodiment are similar to those of the first embodiment, and hence description thereof is omitted herein. In the second embodiment, the mask time period of the mask signal is sequentially changed so as to follow the change of the rotation speed of the rotary polygon mirror 205. Now, with reference to FIG. 10, the rotation speed changing control of the rotary polygon mirror 205 at the time of change of the image forming speed will be described.

(Rotation Speed Changing Control)

Figure 10:
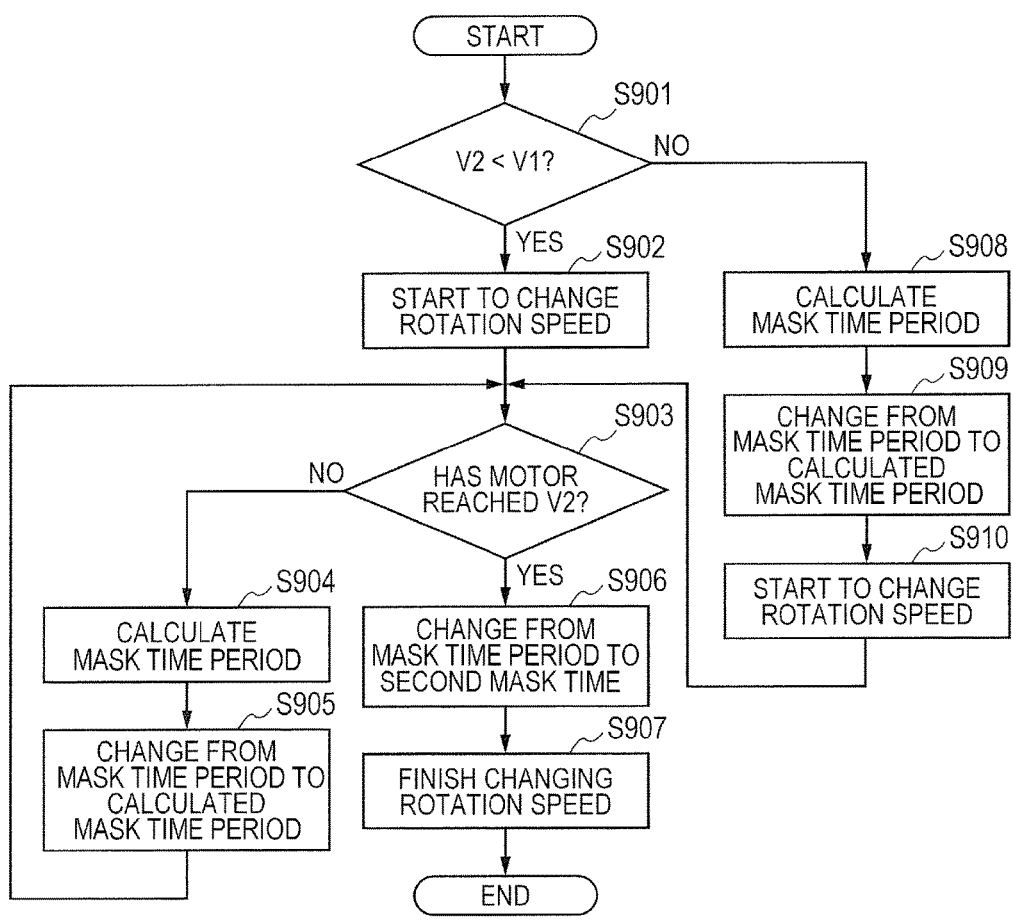
FIG. 10 is a flowchart for illustrating rotation speed changing control to be executed by a rotation control portion according to a second embodiment.
Figure 11:
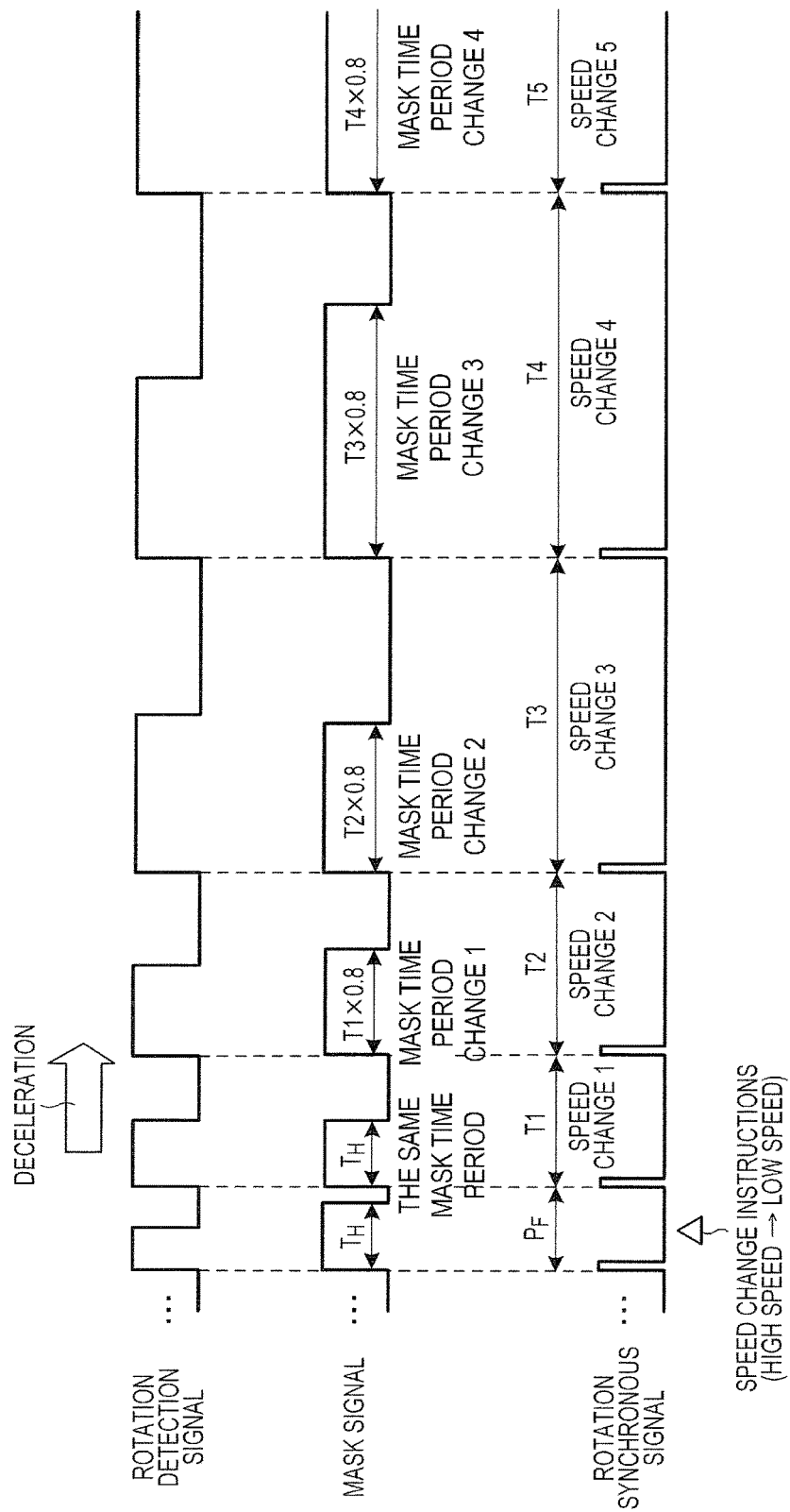
FIG. 11 is a timing chart for illustrating a rotation detection signal, a mask signal, and a rotation synchronous signal at the time of change from a high speed to a low speed according to the second embodiment.

FIG. 10 is a flowchart for illustrating the rotation speed changing control to be executed by the rotation control portion 304 according to the second embodiment. The rotation control portion 304 executes the rotation speed changing control based on a program stored in the memory (storage portion) 310. When the rotation control portion 304 receives, from the CPU 301, an instruction to change the rotation speed of the motor 210 from a currently-set first rotation speed V1 to a second rotation speed V2 that is different from the first rotation speed V1, the rotation control portion 304 starts the rotation speed changing control. The rotation control portion 304 determines whether or not the second rotation speed V2 is lower than the first rotation speed V1 (S901). When the second rotation speed V2 is lower than the first rotation speed V1 (YES in S901), the rotation control portion 304 outputs the deceleration signal to the motor drive portion 305 to start the change of the rotation speed of the motor 210 (S902). That is, when the rotation speed of the motor 210 is changed from the high speed to the low speed, the rotation control portion 304 changes the rotation speed of the motor 210 before the mask time period of the mask signal is changed.

The rotation control portion 304 determines whether or not the rotation speed of the motor 210 has reached the second rotation speed V2 based on the rotation synchronous signal (S903). When the rotation speed of the motor 210 has not reached the second rotation speed V2 (NO in S903), the rotation control portion 304 calculates a mask time period corresponding to the current rotation speed of the motor 210 based on the rotation synchronous signal (S904). When the rotation speed of the motor 210 is changed from the high speed to the low speed, the motor 210 is decelerated, and hence the mask time period of the mask signal is increased. The rotation control portion 304 changes the mask time period of the mask signal to the calculated mask time period (S905). When the rotation speed of the motor 210 is changed from the high speed to the low speed, the rotation control portion 304 changes the mask time period of the mask signal after the rotation speed of the motor 210 is changed. The processing returns to Step S903 so that the rotation control portion 304 determines again whether or not the rotation speed of the motor 210 has reached the second rotation speed V2 based on the rotation synchronous signal (S903). As described above, until the rotation speed of the motor 210 reaches the second rotation speed V2, the rotation control portion 304 changes the mask time period of the mask signal in accordance with the change of the rotation speed of the motor 210. When the rotation speed of the motor 210 has reached the second rotation speed V2 (YES in S903), the rotation control portion 304 changes the mask time period of the mask signal to the second mask time period corresponding to the second rotation speed V2 (S906). The rotation control portion 304 finishes changing the rotation speed of the motor 210 (S907). The rotation speed of the motor 210 is maintained at the second rotation speed V2 by the rotation control portion 304. The rotation control portion 304 ends the rotation speed changing control.

Now, the rotation detection signal, the mask signal, and the rotation synchronous signal in Step S902 to Step S905 of the flowchart of FIG. 10 will be described. FIG. 11 is a timing chart for illustrating the rotation detection signal, the mask signal, and the rotation synchronous signal at the time of change from the high speed to the low speed according to the second embodiment. When an instruction to change the rotation speed of the motor 210 from the high speed to the low speed is received, as illustrated in FIG. 11, the mask time period of the mask signal is not changed based on the rising edge of the first rotation synchronous signal from the speed changing instruction, and only the rotation speed of the motor 210 is first changed. Then, the mask time period of the mask signal is changed to the calculated mask time period based on the rising edge of the next rotation synchronous signal, and the rotation speed of the motor 210 is also changed.

In this case, the mask time period is calculated by multiplying the period of the rotation synchronous signal corresponding to the previous rotation speed by a predetermined coefficient α. In this embodiment, the predetermined coefficient α is set to 0.8. However, the predetermined coefficient α is not limited to 0.8 and may be any other numerical value. The predetermined coefficient α may be appropriately set based on the characteristic of the motor 210, the difference between the first rotation speed V1 and the second rotation speed V2, and the like. Further, the mask time period $T_H$ of the mask signal corresponding to the first rotation speed V1 is set by multiplying the period $P_F$ of the rotation synchronous signal corresponding to the first rotation speed V1 by a predetermined coefficient β. In this embodiment, the predetermined coefficient β is 0.8. However, the predetermined coefficient β is not limited to 0.8 and may be any other numerical value.

The mask time period at a first speed change 1 from the start of the speed change is the same as the mask time period $T_H$ corresponding to the first rotation speed V1. Then, the mask signal having the mask time period $T_H$ is used in a period T1 of the rotation synchronous signal at the speed change 1. At a mask time period change 1 corresponding to a speed change 2, the period T1 at the time of the previous speed change 1 is multiplied by 0.8 to calculate the mask time period of T1×0.8. Then, in a period T2 of the rotation synchronous signal at the speed change 2, the mask signal having the mask time period of T1×0.8 is used. Similarly, at a mask time period change 2 corresponding to a speed change 3, the period T2 at the time of the previous speed change 2 is multiplied by 0.8 to calculate the mask time period of T2×0.8. In a period T3 of the rotation synchronous signal at the speed change 3, the mask signal having the mask time period of T2×0.8 is used. Then, similarly, until the rotation speed of the motor 210 reaches the second rotation speed V2 (set speed after the change), the mask time period is calculated for each rotation synchronous signal to repeat the change of the mask signal. When the rotation speed of the motor 210 reaches the second rotation speed V2 (set speed after the change), the rotary polygon mirror 205 is stably rotated while removing the noise with the mask signal having the second mask time period $T_L$ (not shown) corresponding to the second rotation speed V2.

Referring back to FIG. 10, when the second rotation speed V2 is not lower than the first rotation speed V1 (NO in S901), on the other hand, the rotation control portion 304 calculates the mask time period corresponding to the current rotation speed of the motor 210 based on the rotation synchronous signal (S908). When the rotation speed of the motor 210 is changed from the low speed to the high speed, the motor 210 is accelerated, and hence the mask time period of the mask signal is reduced. The rotation control portion 304 changes the mask time period of the mask signal to the calculated mask time period (S909). After that, the rotation control portion 304 outputs the acceleration signal to the motor drive portion 305 to start the change of the rotation speed of the motor 210 (S910). When the rotation speed of the motor 210 is changed from the low speed to the high speed, the rotation control portion 304 changes the rotation speed of the motor 210 after the mask time period of the mask signal is changed. The processing proceeds to Step S903.

The rotation control portion 304 determines whether or not the rotation speed of the motor 210 has reached the second rotation speed V2 based on the rotation synchronous signal (S903). When the rotation speed of the motor 210 has not reached the second rotation speed V2 (NO in S903), the rotation control portion 304 calculates a mask time period corresponding to the current rotation speed of the motor 210 based on the rotation synchronous signal (S904). When the rotation speed of the motor 210 is changed from the low speed to the high speed, the motor 210 is accelerated, and hence the mask time period of the mask signal is decreased. The rotation control portion 304 changes the mask time period of the mask signal to the calculated mask time period (S905). The processing returns to Step S903, and the rotation control portion 304 determines again whether or not the rotation speed of the motor 210 has reached the second rotation speed V2 based on the rotation synchronous signal (S903). As described above, until the rotation speed of the motor 210 reaches the second rotation speed V2, the rotation control portion 304 changes the mask time period of the mask signal in accordance with the change of the rotation speed of the motor 210. When the rotation speed of the motor 210 has reached the second rotation speed V2 (YES in S903), the rotation control portion 304 changes the mask time period of the mask signal to the second mask time period corresponding to the second rotation speed V2 (S906). The rotation control portion 304 finishes changing the rotation speed of the motor 210 (S907). The rotation speed of the motor 210 is maintained at the second rotation speed V2 by the rotation control portion 304. The rotation control portion 304 ends the rotation speed changing control.

Now, the rotation detection signal, the mask signal, and the rotation synchronous signal in Step S908 to Step S910 and Step S903 to Step S905 of the flowchart of FIG. 10 will be described. FIG. 12 is a timing chart for illustrating the rotation detection signal, the mask signal, and the rotation synchronous signal at the time of change from the low speed to the high speed according to the second embodiment. When an instruction to change the rotation speed of the motor 210 from the low speed to the high speed is received, as illustrated in FIG. 12, the mask time period of the mask signal is changed based on the rising edge of the first rotation synchronous signal from the speed changing instruction, and the rotation speed of the motor 210 is also changed.

In this case, the first mask time period is calculated by multiplying the period $P_F$ of the rotation synchronous signal corresponding to the previous rotation speed (speed before the change) by a predetermined coefficient γ. In this embodiment, the predetermined coefficient γ is set to 0.75. However, the predetermined coefficient γ is not limited to 0.75 and may be any other numerical value. The predetermined coefficient γ may be appropriately set based on the characteristic of the motor 210, the difference between the first rotation speed V1 and the second rotation speed V2, and the like. Further, the mask time period $T_L$ of the mask signal corresponding to the first rotation speed V1 is set by multiplying the period $P_F$ of the rotation synchronous signal corresponding to the first rotation speed V1 by a predetermined coefficient β. In this embodiment, the predetermined coefficient β is 0.8. However, the predetermined coefficient β is not limited to 0.8 and may be any other numerical value. The predetermined coefficient γ may be the same as the predetermined coefficient β. For example, when the predetermined coefficient γ is set to 0.8, which is the same as the predetermined coefficient β, the first calculated mask time period is the same as the mask time period $T_L$ (=$P_F$×0.8) when the motor 210 is rotated in a steady state at the first rotation speed V1. When the rotation speed of the motor 210 is changed from the low speed to the high speed, the period of the rotation synchronous signal is reduced, and hence the necessary rotation synchronous signal may be masked when the same mask time period is used. In view of this, it is preferred that the predetermined coefficient γ be smaller than the predetermined coefficient β. In view of this, in this embodiment, the predetermined coefficient γ is set to 0.75, which is smaller than the predetermined coefficient β of 0.8.

The mask time period at the first speed change 1 from the start of the speed change is $P_F$×0.75, which is shorter than the mask time period $T_L$ corresponding to the first rotation speed V1. Then, in the period T1 of the rotation synchronous signal at the speed change 1, the mask signal having the mask time period of $P_F$×0.75 is used. After that, the mask time period is calculated by multiplying the period of the previous rotation synchronous signal by the predetermined coefficient α based on the rotation synchronous signal, and the mask time period is changed to the calculated mask time period. Specifically, at the mask time period change 2 corresponding to the speed change 2, the period T1 at the time of the previous speed change 1 is multiplied by 0.8 to calculate the mask time period of T1×0.8. Then, in the period T2 of the rotation synchronous signal at the speed change 2, the mask signal having the mask time period of T1×0.8 is used. Similarly, at the mask time period change 3 corresponding to the speed change 3, the period T2 at the time of the previous speed change 2 is multiplied by 0.8 to calculate the mask time period of T2×0.8. In the period T3 of the rotation synchronous signal at the speed change 3, the mask signal having the mask time period of T2×0.8 is used. Then, similarly, until the rotation speed of the motor 210 reaches the second rotation speed V2 (set speed after the change), the mask time period is calculated for each rotation synchronous signal to repeat the change of the mask signal. When the rotation speed of the motor 210 reaches the second rotation speed V2 (set speed after the change), the rotary polygon mirror 205 is stably rotated while removing the noise by the mask signal having the second mask time period $T_H$ (not shown) corresponding to the second rotation speed V2.

The second embodiment can produce the technical effect similar to that in the first embodiment. Further, with the second embodiment, when the rotation speed of the motor 210 is changed from the first rotation speed (set speed) V1 to the second rotation speed (different set speed) V2, the rotation speed of the motor 210 can be changed while changing the mask time period of the mask signal based on the rotation synchronous signal. Thus, the rotation speed of the motor 210 can be changed while maintaining the noise removal action and without masking the necessary rotation synchronous signal.

In the second embodiment, the rotation control portion 304 determines whether or not the rotation speed of the motor 210 has reached the second rotation speed (set speed after the change) V2 at each rising edge of the rotation synchronous signal (S903). However, the timing of determination of the rotation speed of the motor 210 is not limited thereto. For example, when a change speed difference between the first rotation speed (set speed before the change) V1 and the second rotation speed (set speed after the change) V2 is large, whether or not the rotation speed of the motor 210 has reached the second rotation speed may be determined once every several pulses of the rotation synchronous signal (for example, once every two pulses). Further, depending on the control method, the change of the mask time period, the change of the speed, or the determination on reaching the set speed may be performed based on the falling edge of the rotation synchronous signal. Further, the mask time period of the mask signal is calculated based on the rotation speed of the motor 210 immediately before the determination on reaching the set speed, but the calculation of the mask time period is not limited thereto. For example, a theoretical speed change for shift from the first rotation speed V1 to the second rotation speed V2 may be considered. The mask time period may be set based on the theoretically-calculated rotation speed of the rotary polygon mirror 205 with reference to the number of times of change from the start of the speed change from the first rotation speed V1 to the second rotation speed V2 or the number of clocks (elapsed time) from the start of the change. Further, a theoretical speed change for shift to the second rotation speed V2 may be considered based on the number of revolutions or the rotation speed of the motor 210 or the rotary polygon mirror 205 at the second rotation speed (set speed after the change) V2 to perform a mask setting similar to that described above.

In the second embodiment, similarly to the first embodiment, whether the mask setting is performed first or the change of the rotation speed of the motor 210 is started first is determined based on the relationship between the first rotation speed V1 and the second rotation speed V2. In addition, in the middle of the shift from the first rotation speed V1 to the second rotation speed V2, whether or not the rotation speed has reached the set speed after the change (second rotation speed V2) may be determined to change the mask setting in accordance with the speed at the time of determination. Thus, the noise can be removed with high accuracy.

The embodiments are applicable to the image forming apparatus 120 configured to operate at a plurality of image forming speeds. Of the plurality of rotation speeds of the motor 210, that is, the plurality of rotation speeds of the rotary polygon mirror 205, which correspond to the respective plurality of image forming speeds, the current set rotation speed corresponds to the first rotation speed V1, and the set rotation speed after the change corresponds to the second rotation speed V2. In the embodiments, the mask signal masks the rotation synchronous signal, but a similar effect is produced when the mask signal masks the rotation detection signal. With the embodiments, the effect of noise on the rotation detection signal can be reduced, and the set rotation speed of the rotary polygon mirror 205 can be stably changed.

Further, in the first embodiment and the second embodiment, the rotation control portion 304 executes the mask processing during the reduction of the rotation speed of the motor 210 from the first rotation speed to the second rotation speed. However, the rotation control portion 304 may not execute the mask processing from when the deceleration of the motor 210 from the first rotation speed to the second rotation speed is started to when the deceleration control of the motor 210 is completed, and may execute the mask processing with respect to the second rotation speed after the deceleration control of the motor 210 is completed.

With the embodiments described above, when the rotation speed of the rotary polygon mirror is changed from the high speed to the low speed, the necessary rotation synchronous signal can be prevented from being masked by the mask signal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-055678, filed Mar. 18, 2016, which is hereby incorporated by reference herein in its entirety.

What is claimed is:

1. An image forming apparatus, which is configured to form an image on a recording medium at an image forming speed that is selectively set from a plurality of image forming speeds, the image forming apparatus comprising:
   a photosensitive member;
   a light source configured to emit a light beam;
   a rotary polygon mirror configured to deflect the light beam emitted from the light source so that the light beam scans a surface of the photosensitive member;
   a drive motor configured to rotate the rotary polygon mirror;
   a signal generation unit configured to generate a rotation synchronous signal including a pulse that is generated in a period corresponding to a rotation speed of the rotary polygon mirror; and
   a rotation control unit configured to receive the rotation synchronous signal, and configured to control the rotation speed of the rotary polygon mirror, the rotation control unit being configured to selectively set, based on a set image forming speed, a rotation speed from a plurality of rotation speeds including a first rotation speed and a second rotation speed which is lower than the first rotation speed, to control the drive motor based on the period of the pulse included in the rotation synchronous signal so that the rotary polygon mirror is rotated at a set rotation speed,
   wherein the rotation control unit executes a masking processing of masking the rotation synchronous signal received in a time period from when a pulse is generated in the rotation synchronous signal to when a next pulse is generated in the rotation synchronous signal, and the rotation control unit does not execute a rotation control of the drive motor based on the rotation synchronous signal in the time period in which the masking processing is executed, and the rotation control unit releases the time period, in which the rotation synchronous signal is masked, in synchronization with generation of the next pulse, the masking processing being enabled in synchronization with generation of the pulse,
   wherein a time period in which a first masking processing set with respect to the first rotation speed is enabled is shorter than a time period in which a second masking processing set with respect to the second rotation speed is enabled, and
   wherein, in a sequence of switching the rotation speed of the rotary polygon mirror from the first rotation speed to the second rotation speed without stopping the rotary polygon mirror, the rotation control unit switches the masking processing from the first masking processing to the second masking processing after reduction of the rotation speed of the rotary polygon mirror is started.

2. An image forming apparatus according to claim 1, wherein, when the rotation speed of the rotary polygon mirror is changed from the first rotation speed to the second rotation speed, the rotation control unit switches the masking processing from the first masking processing to the second masking processing in response to completion of the reduction of the rotation speed of the rotary polygon mirror.

3. An image forming apparatus according to claim 1, wherein, when the rotation speed of the rotary polygon mirror is changed from the second rotation speed to the first rotation speed, the rotation control unit switches the masking processing from the second masking processing to the first masking processing before increase of the rotation speed of the rotary polygon mirror is started.

4. An image forming apparatus according to claim 1,
wherein the rotation control unit comprises a masking signal generation unit configured to generate a masking signal, and
wherein, when the masking signal generated by the masking signal generation unit is active, the rotation control unit does not execute the control of the drive motor based on the rotation synchronous signal.

5. An image forming apparatus according to claim 1,
wherein the drive motor comprises a rotor to which the rotary polygon mirror and a permanent magnet are fixed, and a stator to which a coil to be supplied with current from the rotation control unit is fixed,
wherein the signal generation unit comprises a Hall element configured to output a rotation detection signal based on a magnetic force fluctuation caused by rotation of the permanent magnet which is rotated in association with rotation of the rotor, and
wherein the signal generation unit generates the rotation synchronous signal based on a rising edge or a falling edge of the rotation detection signal.

6. An image forming apparatus according to claim 1, further comprising a beam detector configured to detect the light beam deflected by each of a plurality of reflection surfaces of the rotary polygon mirror to output a rotation detection signal,
wherein the signal generation unit generates the rotation synchronous signal based on a rising edge or a falling edge of the rotation detection signal.

7. An image forming apparatus according to claim 1, wherein, when the rotation speed of the rotary polygon mirror is changed from the first rotation speed to the second rotation speed, the rotation control unit switches the masking processing from the first masking processing to the second masking processing before the rotation speed of the rotary polygon mirror reaches the second rotation speed and after a predetermined time period elapses from start of the reduction of the rotation speed of the rotary polygon mirror.

8. An image forming apparatus according to claim 1, wherein, after the rotation control unit switches the masking processing from the first masking processing to the second masking processing, the rotation control unit changes the time period of the second masking processing based on the rotation synchronous signal until the rotation speed of the rotary polygon mirror reaches the second rotation speed.

9. An image forming apparatus according to claim 1, wherein the rotation control unit changes the time period of the second masking processing based on an elapsed time from start of the reduction of the rotation speed of the rotary polygon mirror.

10. An image forming apparatus, which is configured to form an image on a recording medium at an image forming speed that is selectively set from a plurality of image forming speeds, the image forming apparatus comprising:
a photosensitive member;
a light source configured to emit a light beam;
a rotary polygon mirror configured to deflect the light beam emitted from the light source so that the light beam scans a surface of the photosensitive member;
a drive motor configured to rotate the rotary polygon mirror;
a signal generation unit configured to generate a rotation synchronous signal including a pulse that is generated in a period corresponding to a rotation speed of the rotary polygon mirror; and
a rotation control unit configured to control the rotation speed of the rotary polygon mirror, the rotation control unit being configured to selectively set, based on a set image forming speed, a rotation speed from a plurality of rotation speeds including a first rotation speed and a second rotation speed which is lower than the first rotation speed, to control the drive motor based on the period of the pulse included in the rotation synchronous signal so that the rotary polygon mirror is rotated at a set rotation speed,
wherein the rotation control unit executes a masking processing of masking the rotation synchronous signal received in a time period from when a pulse is generated in the rotation synchronous signal to when a next pulse is generated in the rotation synchronous signal, and the rotation control unit does not execute a rotation control of the drive motor based on the rotation synchronous signal in the time period in which the masking processing is executed, and the rotation control unit releases the time period, in which the rotation synchronous signal is masked, in synchronization with generation of the next pulse, the masking processing being enabled in synchronization with generation of the pulse,
wherein a time period in which a first masking processing set with respect to the first rotation speed is enabled is shorter than a time period in which a second masking processing set with respect to the second rotation speed is enabled, and
wherein, in a sequence of switching the rotation speed of the rotary polygon mirror from the first rotation speed to the second rotation speed without stopping the rotary polygon mirror, the rotation control unit is prevented from executing the masking processing from when reduction of the rotation speed of the rotary polygon mirror is started to when the rotation speed of the rotary polygon mirror reaches the second rotation speed.

11. An image forming apparatus, comprising:
a photosensitive member;
a light source configured to emit a light beam;
a rotary polygon mirror configured to deflect the light beam emitted from the light source so that the light beam scans a surface of the photosensitive member;
a drive motor configured to rotate the rotary polygon mirror;
a signal generation unit configured to generate a rotation synchronous signal including a pulse that is generated in a period corresponding to a rotation speed of the rotary polygon mirror, wherein mask processing is executed on the rotation synchronous signal so as to mask the rotational synchronous signal in a period of the rotation synchronous signal; and a rotation control unit configured to receive the rotation synchronous signal, configured to control the rotation speed based on the rotation synchronous signal, and configured to change a mask processing time period, wherein, in a case in which the rotation control unit executes a deceleration of the rotation speed, the rotation control unit changes the mask processing time period after the deceleration of the rotation speed is started.

* * * * *